(12) United States Patent
Robbins

(10) Patent No.: US 7,788,693 B2
(45) Date of Patent: *Aug. 31, 2010

(54) METHOD OF BROADCASTING DATA FOR PROGRAMMING A RECEIVER

(76) Inventor: Thomas Dean Robbins, 20 S. 3$^{rd}$ Ave., Ferndale, MD (US) 21061

( * ) Notice: Subject to any disclaimer, the term of this patent is extended or adjusted under 35 U.S.C. 154(b) by 2447 days.

This patent is subject to a terminal disclaimer.

(21) Appl. No.: 09/986,662

(22) Filed: Nov. 9, 2001

(65) Prior Publication Data

US 2002/0029386 A1    Mar. 7, 2002

Related U.S. Application Data

(63) Continuation of application No. 09/634,710, filed on Aug. 7, 2000, now Pat. No. 6,317,882.

(60) Provisional application No. 60/221,958, filed on Jul. 31, 2000, provisional application No. 60/171,308, filed on Dec. 21, 1999.

(51) Int. Cl.
| | |
|---|---|
| *H04N 7/10* | (2006.01) |
| *H04N 7/025* | (2006.01) |
| *H04N 5/445* | (2006.01) |
| *G06F 3/00* | (2006.01) |
| *G06F 13/00* | (2006.01) |

(52) U.S. Cl. .......................... 725/58; 725/32; 725/36; 725/38; 725/61

(58) Field of Classification Search ............. 725/32–36, 725/38, 58, 61

See application file for complete search history.

(56) References Cited

U.S. PATENT DOCUMENTS

| | | | |
|---|---|---|---|
| 3,845,391 A | 10/1974 | Crosby | |
| 4,025,851 A | 5/1977 | Haselwood et al. | |
| 4,123,717 A | 10/1978 | Yiu et al. | |
| 4,230,990 A | 10/1980 | Lert, Jr. et al. | |
| 4,450,531 A | 5/1984 | Kenyon et al. | |
| 4,639,779 A | 1/1987 | Greenberg | |
| 4,682,370 A | 7/1987 | Mathews | |
| 4,694,490 A | 9/1987 | Harvey et al. | |
| 4,704,725 A | 11/1987 | Harvey et al. | |
| 4,706,121 A | 11/1987 | Young | |
| 4,857,999 A | 8/1989 | Welsh | |
| 5,125,028 A | 6/1992 | Naito | |

(Continued)

OTHER PUBLICATIONS

*Wink Communications: A Smarter Way to Watch TV*. http://www.wink.com/, Mar. 5, 2001.

(Continued)

*Primary Examiner*—Hunter B. Lonsberry
(74) *Attorney, Agent, or Firm*—Workman Nydegger

(57) ABSTRACT

An automatic reminding system for reminding a user or tuning a receiver, such as a television, radio, recording device, computer, etc. to a particular carrier based on a detected ID code broadcast on that particular carrier. A user first activates the system when a broadcast signal is broadcasting an ID code that corresponds to a program that is broadcast. The receiver will either automatically remind a user that a particular broadcast is being broadcast or tune to a carrier that broadcasts the broadcast that corresponds to the ID code that was previously stored. Further the ID code may alternatively program the receiver with a date/time stamp to automatically tune to a particular carrier at a particular time.

14 Claims, 16 Drawing Sheets

U.S. PATENT DOCUMENTS

| | | | |
|---|---|---|---|
| 5,152,011 A | 9/1992 | Schwob | |
| 5,210,611 A | 5/1993 | Yee et al. | |
| 5,212,818 A | 5/1993 | Fukami | |
| 5,220,682 A | 6/1993 | Tomohiro | |
| 5,239,681 A | 8/1993 | Parnall et al. | |
| 5,303,401 A | 4/1994 | Duckeck et al. | |
| 5,416,508 A | 5/1995 | Sakuma et al. | |
| 5,446,919 A * | 8/1995 | Wilkins | 725/35 |
| 5,513,385 A | 4/1996 | Tanaka | |
| 5,577,048 A | 11/1996 | Kasa | |
| 5,581,614 A | 12/1996 | Ng et al. | |
| 5,584,061 A | 12/1996 | Kimura et al. | |
| 5,640,484 A | 6/1997 | Mankovitz | |
| 5,640,696 A | 6/1997 | Ishikawa et al. | |
| 5,643,088 A | 7/1997 | Vaughn et al. | |
| 5,657,072 A | 8/1997 | Aristides et al. | |
| 5,732,338 A | 3/1998 | Schwob | |
| 5,749,048 A | 5/1998 | Masuda | |
| 5,790,198 A | 8/1998 | Roop et al. | |
| 5,802,066 A | 9/1998 | Miyake et al. | |
| 5,826,165 A | 10/1998 | Echeita et al. | |
| 5,878,222 A * | 3/1999 | Harrison | 725/139 |
| 5,949,492 A | 9/1999 | Mankovitz | |
| 5,969,715 A | 10/1999 | Dougherty et al. | |
| 2003/0131356 A1 * | 7/2003 | Proehl et al. | 725/58 |

OTHER PUBLICATIONS

*What is Wink?* http://www.wink.com/contents/whatiswink.shtml, Mar. 5, 2001.

*What is Wink: How wink works.* http://www.wink.com/contents/howitworks.shtml, Mar. 5, 2001.

*What is Wink—Examples.* http://www.wink.com/examples.shtml, Mar. 5, 2001, (2 printed pages).

*Wink: Technology Components.* http://www.wink.com/contents/technology.shtml, Mar. 5, 2001.

*Wink System Diagram.* http://www.wink.com/contents/tech_diagram.shtml, Mar. 5, 2001.

*TiVo, TV your way.* TiVo brochure. Mar. 16, 2001.

*What is TiVo—FAQ's.* http://www.tivo.com/discover/faq_index.asp?frames=yes, Mar. 20, 2001.

*TiVo Delivers Ipreview Feature*, TWICE.com, Greg Tarr. May 29, 2000, pp. 1-2.

*TiVo Adds 'Ipreview' Feature*, Multichannel News, Monica Hogan, Oct. 25, 1999, pp. 1-2.

* cited by examiner

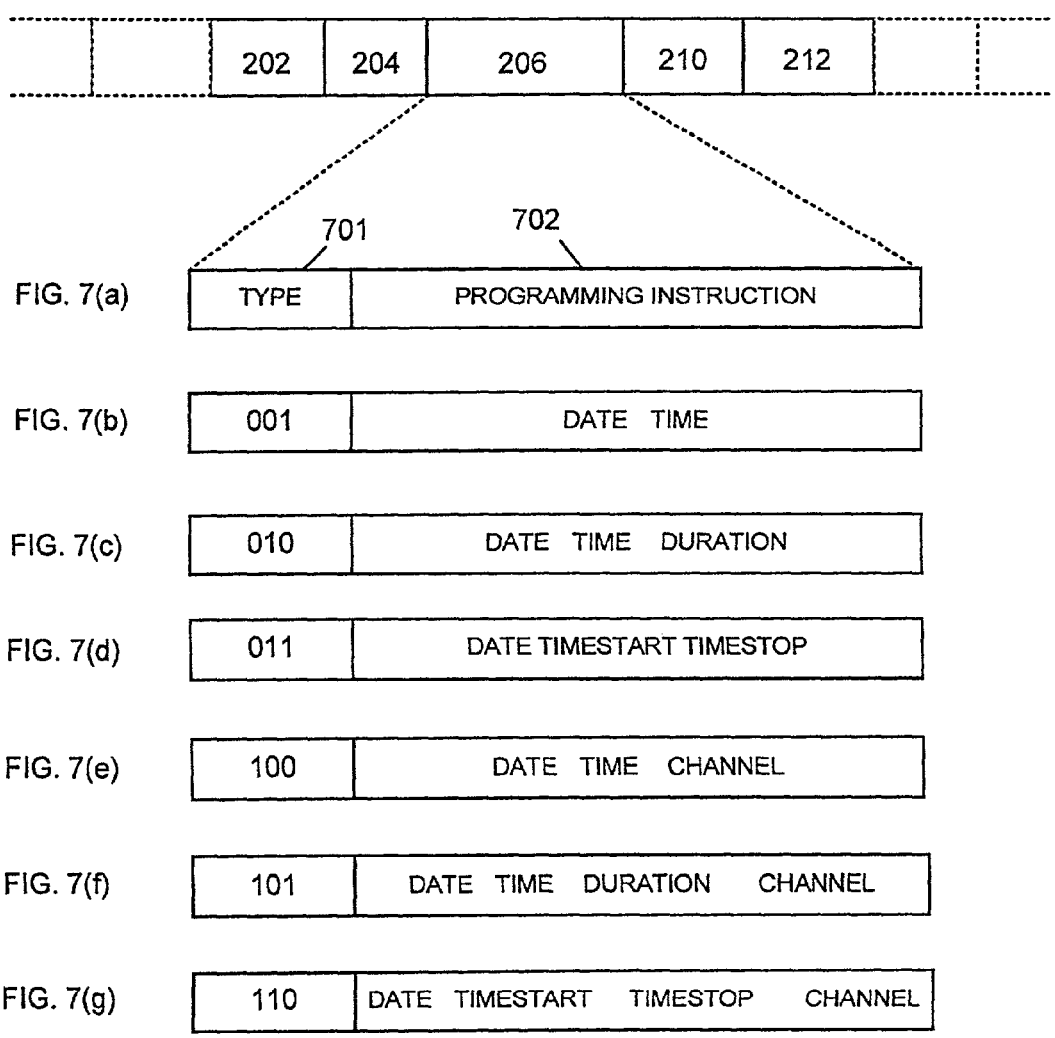

METHOD OF BROADCASTING DATA FOR PROGRAMMING A RECEIVER

This application is a continuation of U.S. application Ser. No. 09/634,710 filed Aug. 7, 2000, now U.S. Pat. No. 6,317, 882 issued Nov. 13, 2001, which in turn claimed priority under 35 U.S.C. §119(e) from provisional U.S. Application No. 60/221,958, filed Jul. 31, 2000, and provisional U.S. Application No. 60/171,308, filed Dec. 21, 1999. The entire disclosures of U.S. application Ser. No. 09/634,710, provisional U.S. Application No. 60/221,958, and provisional U.S. Application No. 60/171,308, are incorporated herein by reference.

SUMMARY OF THE INVENTION

The present invention comprises a method and apparatus for automatically reminding a user that a particular program is being broadcast on a particular data stream. The present invention may further comprise a method and apparatus for automatically tuning a receiver to a specific data stream within a predetermined spectrum of data streams either by detecting an ID code on the specific data stream, or by pre-programming the receiver with a previously stored ID code.

BACKGROUND OF THE INVENTION

Presently used receiver devices, such as for example, a radio, television, computer, "set-top-box", or recording device, may receive a plurality of different data streams.

The use and operation of radios and televisions have been well known for many years. Computers, on the other hand, now have the capability of receiving television and radio broadcasts. The Internet, or any other dynamic data transfer media, now provides a potential medium for viewing television programs or listening to audio programs. Therefore, a person may now view a television program, or listen to an audio program, using a computer, or equivalent data transfer media access device. As such, a user may access a particular data stream, such as for example by accessing a web site, or web page on a web site, that broadcasts at least one data stream, and receive a broadcast similar to a television or radio broadcast.

Presently used receivers may be tuned manually (or by remote control such as infra-red emitter or voice activation) to a specific data stream in order to receive the signal carried on the data stream, such as for example, a song on the radio or a program on the television. As such, if a person wishes to listen to a particular radio station or view a particular television channel he must tune each respective device to that particular station or channel. However, if a person wishes to hear a particular program, such as a song on a radio, or see a particular program, such as on a television, he must: 1) know when it will be broadcast; 2) know which station or channel it will be broadcast; and 3) tune the receiving device to that particular station or channel at the time of the broadcast. In an attempt to eliminate this problem, methods have been developed for automatically tuning a device to a particular channel or station.

U.S. Pat. No. 4,682,370, to Mathews, the entire disclosure of which is incorporated herein by reference, discloses a method and apparatus for detecting and playing desired audio segments over a broadcast receiver such as a radio or television. Specifically, Mathews teaches a receiving system wherein desired audio segments are input and stored from an external source such as a RAM or radio station. The desired audio segments are compared with audio segments on radio stations to automatically tune the radio upon detection of the stored audio segments. The system of Mathews may be used with multiple embodiments of the present invention.

U.S. Pat. No. 5,749,048 (the '048 patent), to Masuda, the entire disclosure of which is incorporated herein by reference, discloses a method and apparatus for detecting desired radio station formats and automatically switching a radio to a format similar to a format of the radio station that the radio is currently tuned to, when signal strength of the current radio station drops below a predetermined threshold. The system of Masuda may be used with multiple embodiments of the present invention.

Similar to the '048 patent, U.S. Pat. No. 5,152,011 (the '011 patent) and 5,732,338 (the '338 patent), both to Schwob, the entire disclosures of which are incorporated herein by reference, disclose methods and apparatuses for detecting and updating station formats, and may be used with multiple embodiments of the present invention.

So-called "programming guide" services permit programming of a television and/or recording device to automatically tune to a particular channel, at a particular time and date, in order to view a particular program. Examples of such programming guides and the general technology used with such systems may be found in: U.S. Pat. No. 5,732,338 to Schwob; U.S. Pat. No. 5,790,198 to Roop et al.; U.S. Pat. No. 5,657, 072 to Aristides et al.; U.S. Pat. No. 4,706,121 to Young; U.S. Pat. No. 5,640,484 to Mankovitz; and U.S. Pat. No. 5,416,508 to Sakuma et al., the entire disclosures of which are incorporated herein by reference.

Permitting a user to program a television, radio, recorder, and/or computer to receive specific programs does not only benefit the user, but further benefits the advertisers.

Television broadcast programs are comprised essentially of first run or syndicated feature programs and commercials, wherein said broadcast programs are either performed live or prerecorded for airing at certain times for specific stations. Commercials often consist of about a 30-second program that is inserted at various times during the viewing day by the station according to contracts made with the commercial owner or advertising agency. This is referred to as buying television time spots. Pursuant to a contract, the television station arranges to insert the commercial program in certain times arranged as part of that contract. For time to time, the television station then bills the buyer of the time spot for having aired the commercial.

The practice over many years has been that a statement is made by the television station under oath to the effect that the commercials were aired at the times bought and that said airing was within the terms contracted. Upon receipt of the sworn statement and the bill, those documents are compared manually, and if they match the commercial time spot that is paid for. However, not all commercials are aired properly and/or at the proper time. This occurs for many different reasons at each of the stations. It has become a practice to audit these airings by visual observation. Such auditing is very time consuming, labor intensive and tedious since it is necessary to monitor all of the channels in any particular area on a round the clock basis. Therefore, only samplings are done for auditing purposes. Such sample auditing is normally done under contract, and conducted by employees who record what they see on the television and return such records to their employer for collation and reporting. Because of the labor-intensive nature of the sample auditing it is very expensive and not always reliable.

Radio broadcasts have similar time spot billing practices. Therefore advertisers face similar problems when contracting for radio station time spots.

Large sums of money are spent annually to purchase advertising time on broadcast radio and television. This has created a need to monitor and report on the broadcast of radio and television programs in general and commercials in particular. As such, various methods and systems have been developed in order to automatically monitor programs broadcast by both television and radio stations. These methods deal with sending information that describes a particular broadcast along with the broadcast signal, such that the receiving system may identify the broadcast signal. Non-limiting examples of these methods include sending the descriptive information during the vertical blanking interval ("VBI") for television systems, sending the descriptive information within the closed captioned ("CC") portion of the video signal for television systems, and sending the descriptive information along an audio frequency sub-carrier for either radio or television systems.

Examples of systems describing a method of sending the descriptive information during the VBI for television systems include, U.S. Pat. No. 4,025,851, to Haselwood, and U.S. Pat. No. 4,639,779, to Greenberg, the entire disclosures of which are incorporated herein by reference, and which may be used with multiple embodiments of the present invention.

An example of a system describing a method for sending the descriptive information within the CC portion of the video signal for television systems is U.S. Pat. No. 4,857,999, to Welsh, the entire disclosure of which is incorporated herein by reference, and which may be used with multiple embodiments of the present invention.

An example of a system describing a method for sending the descriptive information along an audio frequency sub-carrier for either radio or television systems is U.S. Pat. No. 3,845,391, to Crosby, the entire disclosure of which is incorporated herein by reference, and which may be used with multiple embodiments of the present invention.

An example of a system describing a method for sending the descriptive information simultaneously with the broadcast program in a multiplex modulation format in a radio system is U.S. Pat. No. 5,220,682, to Tomohiro, the entire disclosure of which is incorporated herein by reference, and which may be used with multiple embodiments of the present invention.

Furthermore, with respect to digital information broadcasting, a method of packetizing the data may be used. With this method, data is grouped into packets, such as audio, video, and miscellaneous packets, wherein the manipulation of the data is simplified by manipulating the data packets. An example of a system describing a method for sending descriptive information simultaneously with a broadcast program as a digital packetized transmission is U.S. Pat. No. 5,826,165, to Echeita et al., the entire disclosure of which is incorporated herein by reference, and which may be used with multiple embodiments of the present invention.

As such, there still remains a need for a system that provides easy user programming of a receiver system for automatic tuning to a broadcast of a specific program.

BRIEF DESCRIPTION OF THE INVENTION

The present invention provides a method and apparatus for preprogramming a receiver to receive specific signals without the faults accompanying the prior art systems as described above.

It is an object of the present invention to provide a method and apparatus for preprogramming a receiver to automatically tune to a data stream that is broadcasting a predetermined program.

It is another object of the present invention to provide a method and apparatus for preprogramming a receiver to automatically tune to a data stream that is broadcasting a predetermined program, without a need to store the beginning of the predetermined program.

It is still another object of the present invention to provide a method and apparatus for preprogramming receiver that is receiving a signal, to detect and store an identification signal that may be used to identify a broadcast signal.

The system and method of the present invention provides an efficient and simple method for automatically tuning a receiver to a specific data stream either upon detection of a predetermined signal, or by programming the receiver itself. Furthermore, the system and method of the present invention may be implemented with a separate device that is connected to a respective receiver.

In one embodiment of the invention, when a user activates a specific function of a receiver, wherein the system is receiving a transmitted signal, the receiver detects and stores an identification ("ID") code that is transmitted within the transmitted signal.

The ID code may be affiliated with the respective broadcast signal, wherein the ID code may be used for recognition of the broadcast signal. Alternatively, the ID code may be used to program a respective receiver for reception of the broadcast signal. In one exemplary implementation of the present invention, the ID code may a universal ID code in which part of the transmitted ID code would indicate to a receiver whether the ID code may be used for recognition of the broadcast signal, or that the ID code may be used to program a respective receiver for reception of the broadcast signal.

The ID code itself may be derived from an industry standard for a respective industry. For example, a particular industry may determine a particular method or algorithm for assigning specific ID codes, including code length, for respective broadcast signals. The algorithm may take into consideration factors such as: system type, such as television, radio, etc.; data stream type, such as UHF, VHF, AM, FM, etc.; ID code type, such as repeating, bait, or capture; method of carrying the ID code, such as VBI, CC, sub-carrier, etc.; and the specific information in the signal corresponding the respective ID code, such as particular video signal, audio signal, etc.

Additionally, the ID code may be derived from a manipulation of the specific information in the signal that corresponds to the respective ID code. Non-limiting examples may include Fourier transforming, averaging, compressing, summing, subtracting, filtering, or modulating at least some portion of the respective broadcast signal.

As for broadcasting the ID code, such methods of broadcasting information may be used that are well established such as, during the VBI of the program signal, during the CC portion of the program signal, along an audio frequency sub-carrier, or through packetizing as described above. In computer related embodiments wherein the data stream includes a network, such as the Internet, a method of broadcasting information, may include any known method of sending data, such as for example by multiplexing or packetizing.

As for receiving the ID code, such methods of receiving, detecting, and extracting specific coded data may be used that are well established such as, during the VBI of the program signal, during the CC portion of the program signal, along an audio frequency sub-carrier, or through packetizing, each of which is described above. In computer related embodiments wherein the data stream includes a network, such as the Internet, a method of receiving, detecting, and extracting, may include any known method of receiving data, such as for example by demultiplexing or packetizing.

As for storing the ID code, once the ID code has been received, detected, and extracted, a non-volatile memory may be used so that any written data can be retained even if the power supply to the receiver is turned off.

Further, embodiments of the present invention may include an availability indicator may be broadcast with the program in order to indicate to a user that the program is broadcasting an ID code. Non-limiting examples of availability indicators may include: visual icons, such as station identification marks, weather report symbols, or traffic report symbols, that are superimposed on the video signal and therefore on the image during the respective identifying program; or audio sound bites that are superimposed over the audio signals and therefore on the sound during the respective identifying program.

Still further, embodiments of the present invention may include a confirmation indicator that indicates to the user that the ID code has been received, detected, and extracted. A receiver in accordance with an embodiment of the present invention may emit a confirmation indication signal from a confirmation indicator to inform the user that an ID code has been stored. Non-limiting examples of confirmation indicators include visual indicators (such as video images on the screen of the receiver, or an LED on the receiver), and/or audio indicators. Similarly, embodiments of the present invention may include a malfunction indicator that indicates to the user that the ID code has not been received, detected, and/or extracted. A receiver in accordance with an embodiment of the present invention may emit a malfunction indication signal from a malfunction indicator to inform the user that an ID code has not been stored. Non-limiting examples of confirmation indicators include visual indicators (such as video images on the screen of the receiver, or an LED on the receiver), and/or audio indicators.

Once a receiving system in accordance with the present invention has received, detected, extracted, and stored an ID code, the following embodiments and implementations may be used.

In one embodiment of a first implementation of the present invention, a television viewer, while seeing a commercial of a broadcast that is broadcast during a currently viewed program, may decide that he would like to see that particular broadcast at the time it is broadcast. In accordance with one embodiment of the invention, a viewer may easily program the television to automatically tune to a channel broadcasting that particular program, when that particular program is broadcast.

For example, during a program, such as for example a syndicated situation comedy that is broadcast on a particular station, the program may be briefly interrupted by a commercial that is advertising another program that is broadcast. The program that is broadcast may be any type of program, non-limiting examples include: another program, such as for example another syndicated situation comedy; a different episode of the current program; a program on a different channel; a portion of a program, such as the traffic or weather portions of a newscast; a music video, etc.

By using a television system in accordance with one embodiment of the present invention, the viewer may activate an automatic reminder system that will detect and store an ID code that is broadcast with the commercial of the program that is broadcast, wherein the ID code corresponds to the program that is broadcast. After activating the automatic reminder system, when the broadcast program is eventually broadcast, an ID code transmitted with the broadcast is detected, the ID code of the broadcast is compared with the previously stored ID code, and the system may: compile the information into a database that the viewer can access; automatically tune to the channel that is broadcasting the program at the time of the broadcast; display a message on the television when the program time arrives; automatically initiate the recording of a recording device; or take any other action to alert or make it easy for a viewer to remember to watch the program.

In another embodiment of the first implementation of the invention, similar to the embodiment described immediately above, in some instances, the program that is broadcast may be broadcast multiple times. Further, in such instances, the viewer may wish to see the broadcast at every instance it is broadcast. Therefore, after activating the automatic reminder system, every time the broadcast program is broadcast, an ID code transmitted with the broadcast is detected, the ID code of the broadcast is compared with the previously stored ID code, and the system may compile the information into a database that the viewer can access; automatically tune to the channel that is broadcasting the program at the time of the broadcast; display a message on the television when the program time arrives; automatically initiate the recording of a recording device; or take any other action to alert or make it easy for a viewer to remember to watch the program.

By using a television system in accordance with yet another embodiment of the first implementation of the present invention, the viewer may activate an automatic reminder system that will detect and store an ID code that will automatically tune the receiver to a specific data streams at a specific time. In this embodiment, the ID code contains information relating to the time that a broadcast is broadcast. In further related embodiments, the ID code may contain information relating to the duration of the broadcast, the stop time of the broadcast, and/or the data stream of the broadcast.

In one embodiment of a second implementation of the present invention, a radio listener, while listening to a commercial of a broadcast, may decide that he would like to hear that particular broadcast. With a radio in accordance with one embodiment of the present invention, a listener may easily program the radio to compile the information into a database that the listener can access; automatically tune to the station that is broadcasting the program at the time of the broadcast; sound an alert when the program time arrives; automatically initiate the recording of a recording device; or take any other action to alert or make it easy for a listener to remember to listen the program, when that particular program is broadcast.

For example, while listening to the radio, a listener may hear a particular program that he likes. Further, he would like to hear this particular program every time the program is broadcast on at least one station within range of the radio. The program that is broadcast may be any type of program, non-limiting examples include: a song; a portion of a program, such as the traffic portion or weather portions of a newscast; a promotional contest, etc. By using a radio system in accordance with one embodiment of the present invention, when listening to a program that the listener wishes to hear for any broadcasts of the program, the listener may activate an automatic reminder system that will detect, extract, and store an ID code that is broadcast with the program that is currently playing, and that is broadcast, wherein the ID code corresponds to the program that is broadcast. After activating the automatic reminder system, when the program is broadcast, an ID code transmitted with the broadcast is detected, the ID code of the broadcast is compared with the previously stored ID code, and the system may easily compile the information into a database that the listener can access; automatically tune to the station that is broadcasting the program at the time of the broadcast; sound an alert when the program time arrives; automatically initiate the recording of a recording device; or take any other action to alert or make it easy for a listener to remember to listen the program, when that particular program is broadcast.

In another embodiment of the second implementation of the invention, similar to the embodiment described immediately above, in some instances, the program that is broadcast may be broadcast multiple times. Further, in such instances, the listener may wish to listen the broadcast at every instance it is broadcast. Therefore, after activating the automatic reminder system, every time the broadcast program is broadcast, an ID code transmitted with the broadcast is detected, the ID code of the broadcast is compared with the previously stored ID code, and the system may easily compile the information into a database that the listener can access; automatically tune to the station that is broadcasting the program at the time of the broadcast; sound an alert when the program time arrives; automatically initiate the recording of a recording device; or take any other action to alert or make it easy for a listener to remember to listen the program, when that particular program is broadcast.

By using a radio in accordance with yet another embodiment of the second implementation of the present invention, the listener may activate an automatic reminder system that will detect and store an ID code that will automatically tune the receiver to a specific station at a specific time. In this embodiment, the ID code contains information relating to the time that a broadcast is broadcast. In further related embodiments, the ID code may contain information relating to the duration of the broadcast, the stop time of the broadcast, and/or the data stream of the broadcast.

With a computer in accordance with one embodiment of a third implementation of the present invention, a user may easily program the computer to automatically tune to a data stream, for example a particular web site, or web page on a web site, broadcasting a particular program, when that particular program is broadcast.

For example, during a program, such as for example a syndicated situation comedy that is broadcast on a particular web site, or web page on a web site, the program may be briefly interrupted by a commercial that is advertising another program that is broadcast. The program that is broadcast may be any type of program, non-limiting examples include: another program, such as for example another syndicated situation comedy; a different episode of the current program; a program on a different web site, or web page on a web site; a portion of a program, such as the traffic or weather portions of a newscast; a music video, etc.

By using a computer system in accordance with one embodiment of the present invention, the viewer may activate an automatic reminder system that will detect and store an ID code that is broadcast with the commercial of the program that is broadcast, wherein the ID code corresponds to the program that is broadcast. After activating the automatic reminder system, when the broadcast program is eventually broadcast, an ID code transmitted with the broadcast is detected, the ID code of the broadcast is compared with the previously stored ID code, and the system may easily compile the information into a database that the user can access; automatically go to the web site, or web page on a web site, that is broadcasting the program at the time of the broadcast; sound an alert when the program time arrives; automatically initiate the recording of a recording device; or take any other action to alert or make it easy for a user to remember to listen to, or view, the program, when that particular program is broadcast.

In another embodiment of a third implementation of the present invention, with a computer in accordance with one embodiment of the present invention, a user may easily program the computer to automatically tune to a channel, for example a particular web site, or web page on a web site, broadcasting that particular program, every time that particular program is broadcast. After activating an automatic reminder system, every time the broadcast program is broadcast, an ID code transmitted with the broadcast is detected, the ID code of the broadcast is compared with the previously stored ID code, and the system may easily compile the information into a database that the user can access; automatically go to the web site, or web page on a web site, that is broadcasting the program at the time of the broadcast; sound an alert when the program time arrives; automatically initiate the recording of a recording device; or take any other action to alert or make it easy for a user to remember to listen to, or view, the program, when that particular program is broadcast.

By using a computer in accordance with yet another embodiment of the third implementation of the present invention, the user may activate an automatic reminder system that will detect and store an ID code that will automatically instruct the computer to go a specific web site, or web page on a web site, at a specific time. In this embodiment, the ID code contains information relating to the time and/or web site, or web page on a web site, that a broadcast is broadcast. In further related embodiments, the ID code may contain information relating to the duration of the broadcast, the stop time of the broadcast, and/or the data stream of the broadcast.

Computer networks such as the Internet may significantly change the way consumers watch television programs. Currently, programs are broadcast at different times because of the limited number of channels available to broadcasters. However, the Internet will allow broadcasters to broadcast a wider array of programming. Furthermore, the programs may be broadcast on demand.

In one embodiment of a fourth implementation of the present invention, with a recorder in accordance with one embodiment of the present invention, a user may easily program the recorder to either: automatically tune a preexisting host system to a data stream within a predetermined spectrum of data streams when an ID code is detected on that data stream; and/or tune the recorder itself to a data stream within a predetermined spectrum of data streams when an ID code is detected on that data stream.

After activating an automatic reminder system of a recorder in accordance with an embodiment of the present invention, when the broadcast program is eventually broadcast, an ID code transmitted with the broadcast is detected, the ID code of the broadcast is compared with the previously stored ID code, and the recorder will instruct the receiver to automatically tune the host system to the data stream that is broadcasting the program at the time of the broadcast.

In another embodiment of the fourth implementation, after activating the automatic reminder system of a recorder in accordance with an embodiment of the present invention, when the broadcast program is eventually broadcast, an ID code transmitted with the broadcast is detected, the ID code of the broadcast is compared with the previously stored ID code, and the recorder will instruct itself and the host system to automatically tune to the data stream that is broadcasting the program at the time of the broadcast.

In yet another embodiment of the fourth implementation, after activating the automatic reminder system of a recorder in accordance with one embodiment of the present invention, when the broadcast program is eventually broadcast, an ID code transmitted with the broadcast is detected, the ID code of the broadcast is compared with the previously stored ID code, and the recorder may tune itself to the data stream that is broadcasting the program at the time of the broadcast. In this embodiment, a user need not view and/or listen to a particular program in order for the recorder to record the program.

By using a recorder in accordance with still yet a further embodiment of the fourth implementation of the present invention, the viewer may activate an automatic reminder system that will detect and store an ID code that will automatically tune the receiver and the recorder to a specific data stream at a specific time. In this embodiment, the ID code contains information relating to the time and/or data stream that a broadcast is broadcast.

By using a recorder in accordance with still yet another further embodiment of the fourth implementation of the present invention, the viewer may activate an automatic reminder system that will detect and store an ID code that will automatically tune the recorder itself to a specific data stream at a specific time. In this embodiment, the ID code contains information relating to the time and/or data stream that a broadcast is broadcast. In this embodiment, a user need not view and/or listen to a particular program in order for the recorder to record the program.

Still further embodiments of the present invention include systems, for example a set-top box, that may be attached in communication with preexisting receivers, in order to provide a method for automatically tuning the preexisting receiver to a data stream within a predetermined spectrum of data streams when an ID code is detected on that data stream.

A set-top box in accordance with one embodiment of the present invention, as described above, may include all the elements of the above described embodiments, with the exception of replacing the means to reproduce the detected signal on a specific data stream (i.e. a video screen, or speakers) with a means to tune a respective receiver (i.e. a television, a radio, a computer, a recorder, etc.), with which the set-top box is attached in communication.

In another aspect of the present invention, a communication system may be utilized. A plurality of broadcasting/receiving stations; a plurality of broadcasting/receiving stations and a plurality of receiving stations; one broadcasting/receiving station and a plurality of receiving stations; a plurality of broadcasting stations and a plurality of receiving stations; or one broadcasting station and a plurality of receiving stations may be assembled so as to create a communication system. Further, such a communication system may use preexisting data streams, such as RF signals in the radio or TV band, or alternatively, such a communication system may use independent data streams. Still further, such a communication system may use a type of data stream hopping technique in order to utilize preexisting data streams to thereby decrease interference with other content data within the preexisting data streams.

Further, with any of the above described implementations and embodiments of the present invention, a disabling signal may be activated by the user to prevent a receiving system from tuning to a data stream upon detection of a predetermined ID code or upon responding to a previously received instruction to tune to a specific data stream from a previously detected ID code.

Still further, with any of the above described implementations and embodiments of the present invention, the system may have the capability to store a plurality of ID codes that will automatically tune the receiver to a respective specific data streams at respective specific times.

Still even further, with any of the above described implementations and embodiments of the present invention, the system may have a sleep mode, wherein the receiver is able to scan data streams for predetermined ID codes. During the sleep mode, the receiver uses a decrease amount of energy because the receiver is not playing data from the received data streams for a user. However, during the sleep mode, the receiver is able to automatically tune to a specific data stream if a predetermined ID code is detected. With a receiver operating in a sleep mode, the receiver may be dormant, i.e. not playing the data from the received data streams for a user, until a predetermined ID code is detected, wherein the receiver tunes to the data stream carrying the predetermined ID code. The receiver may remain in the sleep mode until the user changes the mode to a fully operational mode, i.e., playing the data on the received data stream. Alternatively, the receiver may remain in the sleep mode until a predetermined ID code is detected, wherein the receiver tunes to the data stream carrying the predetermined ID code and is automatically changed to a fully operational mode, i.e., plays the data on the received data stream. Further, if the receiver is a recorder, the receiver may remain in the sleep mode until a predetermined ID code is detected, wherein the receiver tunes to the data stream carrying the predetermined ID code and is automatically changed to a fully operational mode, i.e., records the data on the received data stream.

The television-related embodiments of the present invention have many benefits over prior art systems. For example, a person may easily program a television for viewing of a desired program. Further, with a system in accordance with an embodiment of the present invention, the viewer need not know the specific channel or time that the desired program is broadcast.

A television and/or recorder system in accordance with an embodiment of the present invention would greatly increase the effectiveness of program advertising during television broadcasting. For example, a person using a television or recorder in accordance with an embodiment of the present invention may be able to respectively view and/or record a program that he wished to see, even though at the time the program broadcast begins he is unaware, through forgetfulness, that the program is about to air. As such, a system in accordance with the present invention may increase the number of members of the viewing audience by decreasing the number of forgetful non-viewing audience members. Therefore, the number of viewers who actually view commercials increase.

The radio-related embodiments of the present invention have many benefits over prior art systems. For example, similar to the television-related embodiments described above, a person may easily program the radio for listening of a desired song. Further, with a system in accordance with the present invention, the viewer need not know the specific station or time that the desired song is broadcast. Furthermore, the present invention would greatly increase advertising flexibility during radio broadcasting. For example, it is conceivable the a person may use a radio in accordance with the present invention to automatically tune a radio to listen to his favorite songs or to listen for particular radio station contests. Therefore, advertisers may benefit from buying time slots for advertisements directly after the most popular songs, or station contests.

To achieve the foregoing and other objects and in accordance with the purpose of the present invention, as embodied and broadly described herein, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same. Further, the step of storing the first ID code may be remotely controlled. The method of tuning may further including the steps of initially scanning the plurality of data streams, and storing receivable data streams within the plurality of data streams, into a memory. Particularly, the receivable data streams may be data streams having a received signal strength above a predetermined threshold. Further, the first ID code may be one of a plurality ID codes detected by one of a plurality of auxiliary receivers. More particularly, wherein the plurality of auxiliary receivers may scan the plurality of data streams in an interlaced fashion.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, further comprises the steps of detecting a third ID code on a third data stream at a third time when the first ID code and the second ID code are not the same, comparing the first ID code with the third ID code, and tuning the receiver to the third data stream when the first ID code and the third ID code are the same. Further, the first ID code may be one of a plurality ID codes detected by one of a plurality of auxiliary receivers. More particularly, the plurality of auxiliary receivers may scan the plurality of data streams in an interlaced fashion. Still more particularly, detection of the second ID code may be accomplished by a first data stream auxiliary receiver and detection of the third ID code may be accomplished by a second data stream auxiliary receiver.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein the first data stream and the second data stream are the same data stream. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein the first data stream and the second data stream are the same data stream.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein the first data stream and the second data stream are not the same data stream. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein the first data stream and the second data stream are not the same data stream.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried with an audio signal. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried with an audio signal. More particularly, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried with a video signal. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried with a video signal. Further, any one of the group consisting of the first ID code and the second ID code, may be carried as packetized data. Still further, any one of the group consisting of the first ID code and the second ID code, may be carried during a vertical blanking interval of the signal. Still even further, any one of the group consisting of the first ID code and the second ID code, may be carried during a closed captioned portion of the signal. Still yet further, any one of the group consisting of the first ID code and the second ID code, may be carried along an audio frequency subcarrier.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried with a data signal. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried with a data signal. More particularly, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried as packetized data. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried during a vertical blanking interval of the signal. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried during a vertical blanking interval of the signal.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried during a closed captioned portion of the signal. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried during a closed captioned portion of the signal.

In another embodiment of the present invention, a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, wherein any one of the group consisting of the first ID code and the second ID code, is carried along an audio frequency subcarrier. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, wherein any one of the group consisting of the first ID code and the second ID code, is carried along an audio frequency subcarrier.

In another embodiment of the present invention, a method of prohibiting a method of tuning a receiver that receives a plurality of data streams, to a single data stream, comprises the steps of detecting a first ID code on a first data stream at a first time within the plurality of data streams, storing the first ID code, detecting a second ID code on a second data stream at a second time after the first time, comparing the first ID code with the second ID code, and tuning the receiver to the second data stream when the first ID code and the second ID code are the same, and further comprises the step of providing a deactivation signal thereby preventing the step of tuning of the receiver to the second data stream when the first ID code and the second ID code are the same. Or alternatively further comprises the steps of detecting a third ID code on a third data stream at a third time when the first ID code and the second ID code are not the same, comparing the first ID code with the third ID code, and tuning the receiver to the third data stream when the first ID code and the third ID code are the same, and further comprises the step of providing a deactivation signal thereby preventing the step of tuning of the receiver to the second data stream when the first ID code and the second ID code are the same. Further the deactivation signal may be provided by a switch activated by a user. Still further, the deactivation signal may be provided for a predetermined time period after a predetermined event.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, the first data stream and the second data stream are the same data stream.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, the first data stream and the second data stream are the same data stream.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, the first data stream and the second data stream are not the same data stream.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, the first data stream and the second data stream are not the same data stream.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried with an audio signal. Furthermore, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried with an audio signal. Furthermore, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried with a video signal. Furthermore, any one of the group consisting of the first ID code and the second ID code, may be carried as packetized data. Still further, any one of the group consisting of the first ID code and the second ID code, may be carried during a vertical blanking interval, during a closed captioned portion, or carried along an audio frequency subcarrier of the signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried with a video signal. Furthermore, any one of the group consisting of the first ID code and the second ID code, may be carried as packetized data. Still further, any one of the group consisting of the first ID code and the second ID code, may be carried during a vertical blanking interval, during a closed captioned portion, or carried along an audio frequency subcarrier of the signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried with a data signal. Furthermore, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried with a data signal. Furthermore, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried as packetized data.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried during a vertical blanking interval of the signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried during a vertical blanking interval of the signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried during a closed captioned portion of the signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried during a closed captioned portion of the signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, any one of the group consisting of the first ID code and the second ID code, may be carried along an audio frequency subcarrier.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, any one of the group consisting of the first ID code and the second ID code, may be carried along an audio frequency subcarrier.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, the step of storing the first ID code may be remotely controlled.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, the step of storing the first ID code may be remotely controlled.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, the step of storing the ID code further comprises a step of detecting an indicator. More particularly, the indicator may be a portion of an image signal. Still more particularly, the indicator may be a portion of an image signal representing an icon. Further, the indicator may be a portion of an audio signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, the step of storing the ID code further comprises a step of detecting an indicator. More particularly, the indicator may be a portion of an image signal. Still more particularly, the indicator may be a portion of an image signal representing an icon. Further, the indicator may be a portion of an audio signal.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further including the steps of initially scanning the plurality of data streams, and storing receivable data streams within the plurality of data streams, into a memory. More particularly, the receivable data streams may be data streams having a received signal strength above a predetermined threshold.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further including the steps of initially scanning the plurality of data streams, and storing receivable data streams within the plurality of data streams, into a memory. More particularly, the receivable data streams may be data streams having a received signal strength above a predetermined threshold.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, the first ID code is one of a plurality ID codes detected by one of a plurality of auxiliary receivers. Further, the plurality of auxiliary receivers scan the plurality of data streams in an interlaced fashion. Still further, detection of the second ID code may be accomplished by a first data stream auxiliary receiver and detection of the third ID code may be accomplished by a second data stream auxiliary receiver. More particularly, detection of the second ID code may be accomplished by a first data stream auxiliary receiver and detection of the third ID code may be accomplished by a second data stream auxiliary receiver.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, the first ID code is one of a plurality ID codes detected by one of a plurality of auxiliary receivers. Further, the plurality of auxiliary receivers scan the plurality of data streams in an interlaced fashion. Still further, detection of the second ID code may be accomplished by a first data stream auxiliary receiver and detection of the third ID code may be accomplished by a second data stream auxiliary receiver. More particularly, detection of the second ID code may be accomplished by a first data stream auxiliary receiver and detection of the third ID code may be accomplished by a second data stream auxiliary receiver.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same. Further, the step of providing a deactivation signal thereby preventing the step of tuning of the receiver to the second data stream when the first ID code and the second ID code are the same. Further, the deactivation signal is provided by a switch activated by a user.

In another embodiment of the present invention, a method of tuning a receiver that receives a plurality of data streams, to a single data stream, comprises the steps of detecting a first ID code on a first data stream at a first time within the plurality of data streams, storing the first ID code in a memory capable of storing a plurality of ID codes, detecting a second ID code on a second data stream at a second time after the first time, comparing every stored ID code with the second ID code, and tuning the receiver to the second data stream when any one of the stored ID codes and the second ID code are the same, further comprises the steps of detecting a third ID code on a third data stream at a third time when none of the stored ID codes and the second ID code are the same, comparing every stored ID code with the third ID code, and tuning the receiver to the third data stream when any one of the stored ID codes and the third ID code are the same. Further, the step of providing a deactivation signal thereby preventing the step of tuning of the receiver to the second data stream when the first ID code and the second ID code are the same. Further, the deactivation signal is provided by a switch activated by a user.

In another embodiment of the present invention, a method of transmitting data comprises the steps of transmitting data of a first program within a first period, transmitting data corresponding to a second program within the first period, and transmitting an ID code at a time during the transmission of the data corresponding to the second program. Further, the step of transmitting data corresponding to a second program further comprises a step of transmitting data corresponding to an availability indicator. Still further, the availability indicator may be portion of an image signal. Particularly, the availability indicator may be a portion of an image signal representing an icon. On the other hand, the availability indicator may be portion of an audio signal.

In another embodiment of the present invention, a method of transmitting data comprises the steps of transmitting data of a first program within a first period, transmitting data corresponding to a second program within the first period, transmitting an ID code at a time during the transmission of the data corresponding to the second program, and transmitting data of the second program within a second period after the first period. Further, the step of transmitting data corresponding to a second program further comprises a step of transmitting data corresponding to an availability indicator. Still further, the availability indicator may be a portion of an image signal. Particularly, the availability indicator may be a portion of an image signal representing an icon. Still even further, the availability indicator may be a portion of an audio signal.

In another embodiment of the present invention, a method of tuning a receiver and a recorder to a single data stream, the receiver and the recorder capable of receiving a plurality of data streams, the method of tuning comprises the steps of detecting a first ID code on a first data stream at a first time within the plurality of data streams, storing the first ID code, detecting a second ID code on a second data stream at a second time after the first time, comparing the first ID code with the second ID code, and tuning the receiver and the recorder to the second data stream when the first ID code and the second ID code are the same.

In another embodiment of the present invention, a method of programming a receiver to tune to a data stream, comprises the steps of viewing a program from a first data stream on the receiver during a first period, viewing a second program from the first data stream on the receiver during a second period that is within the first period, activating the receiver to detecting an ID code from the first data stream during the second period. Further the step of viewing a second program further comprises a step of detecting an availability indicator. Still further, the availability indicator may be a portion of an image signal. Particularly, the availability indicator may be a portion of an image signal representing an icon. Still even further, the availability indicator may be a portion of an audio signal.

In another embodiment of the present invention, a method of programming a receiver to tune to a data stream, comprises the steps of listening to a program from a first data stream on the receiver during a first period, listening to a second program from the first data stream on the receiver during a second period that is within the first period, activating the receiver to detecting an ID code from the first data stream during the second period. Further, the step of listening to the second program further comprises a step of listening to an availability indicator.

A method of tuning a receiver, that is operable in a fully operational mode and a sleep mode, to a single data stream, the receiver capable of receiving a plurality of data streams, the method of tuning comprises the steps of detecting a first ID code on a first data stream at a first time within the plurality of data streams, storing the first ID code, operating the receiver in the sleep mode, detecting a second ID code on a second data stream at a second time after the first time, comparing the first ID code with the second ID code, and tuning the receiver to the second data stream when the first ID code and the second ID code are the same.

In another embodiment of the present invention, a method of tuning a receiver, that is operable in a fully operational mode and a sleep mode, to a single data stream, the receiver capable of receiving a plurality of data streams, the method of tuning comprises the steps of, detecting a first ID code on a first data stream at a first time within the plurality of data streams, storing the first ID code, operating the receiver in the sleep mode, detecting a second ID code on a second data stream at a second time after the first time, comparing the first ID code with the second ID code, and tuning the receiver to the second data stream when the first ID code and the second ID code are the same, and switching the operational mode of the receiver to the fully operational mode.

In another embodiment of the present invention, a method of recording data from a single data stream from a recording receiver, that is operable in a fully operational mode and a sleep mode, the recording receiver capable of receiving a plurality of data streams, the method of recording comprises the steps of detecting a first ID code on a first data stream at a first time within the plurality of data streams, storing the first ID code, operating the recording receiver in the sleep mode, detecting a second ID code on a second data stream at a second time after the first time, comparing the first ID code with the second ID code, tuning the receiver to the second data stream when the first ID code and the second ID code are the same, and switching the operational mode of the recording receiver to the fully operational mode, and recording data from the second data stream.

To achieve the foregoing and other objects and in accordance with the purpose of the present invention, as embodied and broadly described herein, an automatically tunable receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a controller for tuning the main receiver to the second received data stream when the first ID code and the second ID code are the same.

In another embodiment of the present invention, an automatically tunable receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a controller for tuning the main receiver to the second received data stream when the first ID code and the second ID code are the same, wherein the memory is operable to store a plurality of ID codes, and wherein any ID codes detected and extracted by the auxiliary receiver are compared with any ID codes stored in the memory.

In another embodiment of the present invention, an automatically tunable receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a controller for tuning the main receiver to the second received data stream when the first ID code and the second ID code are the same, further comprises a plurality of auxiliary receivers.

In another embodiment of the present invention, an automatically tunable receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a controller for tuning the main receiver to the second received data stream when the first ID code and the second ID code are the same, further comprises a plurality of auxiliary receivers, wherein the plurality of auxiliary receivers detect and extract respective ID codes from different data streams in an interlaced manner.

In another embodiment of the present invention, an automatically tunable receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a controller for tuning the main receiver to the second received data stream when the first ID code and the second ID code are the same, wherein the receiver is either a television, a radio, a computer, or a recorder.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same, wherein the information is a video informing message. Preferably the video informing message may be a text massage formed in a window of the current program. Alternatively, the video informing message may be a text massage overlaying the current program.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same, wherein the information is an audio informing message.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same, wherein the information is an audio alarm.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same, wherein the memory is operable to store a plurality of ID codes, and wherein any ID codes detected and extracted by the auxiliary receiver are compared with any ID codes stored in the memory.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same, further comprises a plurality of auxiliary receivers. Preferably the plurality of auxiliary receivers may detect and extract respective ID codes from different data streams in an interlaced manner.

In another embodiment of the present invention, a user informing receiver, operable to receive a plurality of data streams, comprises a memory, a main receiver that receives the plurality of data streams and is operable to detect a first ID code within a first received data stream, to extract the first ID code from within the first received data stream, to store the first ID code in the memory, an auxiliary receiver that receives the plurality of data streams and is operable to detect a second ID code within a second received data stream, and to extract the second ID code from within the second received data stream, a comparator for comparing the first ID code and the second ID code, a message provider for providing information to the user, a controller for instructing the message provider to providing information to a user when the first ID code and the second ID code are the same, wherein the receiver is either a television, a radio, or a computer.

In another embodiment of the present invention, an ID code that is broadcast within a data stream, the data stream for use with an automatically tunable receiver, operable to receive a plurality of data streams, the ID code comprises a start code portion for identifying the beginning of the ID code, a code type portion for differentiating between a plurality of types of ID codes, a program ID portion for identifying the program within the data stream of which the ID code is broadcast, and an end code portion for identifying the ending of the ID code.

In another embodiment of the present invention, a device for receiving audio visual programs comprises a tuner that allows a viewer to tune to a first audio visual program that contains an advertisement for second audio visual program, a processor that separates the advertisement from an ID code identifying the second audio visual program, and a memory that stores the ID code.

In another embodiment of the present invention, a device for receiving audio visual programs comprises a tuner that allows a viewer to tune to a first audio visual program that contains an advertisement for second audio visual program, a processor that separates the advertisement from an ID code identifying the second audio visual program, and a memory that stores the ID code, further including a controller that automatically adjusts the tuner as a function of the ID code stored in the memory.

In another embodiment of the present invention, a device for receiving audio visual programs comprises a tuner that allows a viewer to tune to a first audio visual program that contains an advertisement for second audio visual program, a processor that separates the advertisement from an ID code identifying the second audio visual program, and a memory that stores the ID code, further including a display generator, and a controller that causes the display generator to produce a message that is a function of the ID code stored in the memory.

In another embodiment of the present invention, a device for receiving audio visual programs comprises a tuner that allows a viewer to tune to a first audio visual program that contains an advertisement for second audio visual program, a processor that separates the advertisement from an ID code identifying the second audio visual program, and a memory that stores the ID code, wherein the ID code is transmitted during the vertical blanking interval of the advertisement.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate exemplary embodiments of the present invention and, together with the description, serve to explain the principles of the invention. In the drawings:

FIGS. 7(A)-7(G) represents further descriptions of exemplary embodiments of the program ID portion in accordance with the present invention;

DETAILED DESCRIPTION OF THE INVENTION

Figure 1:
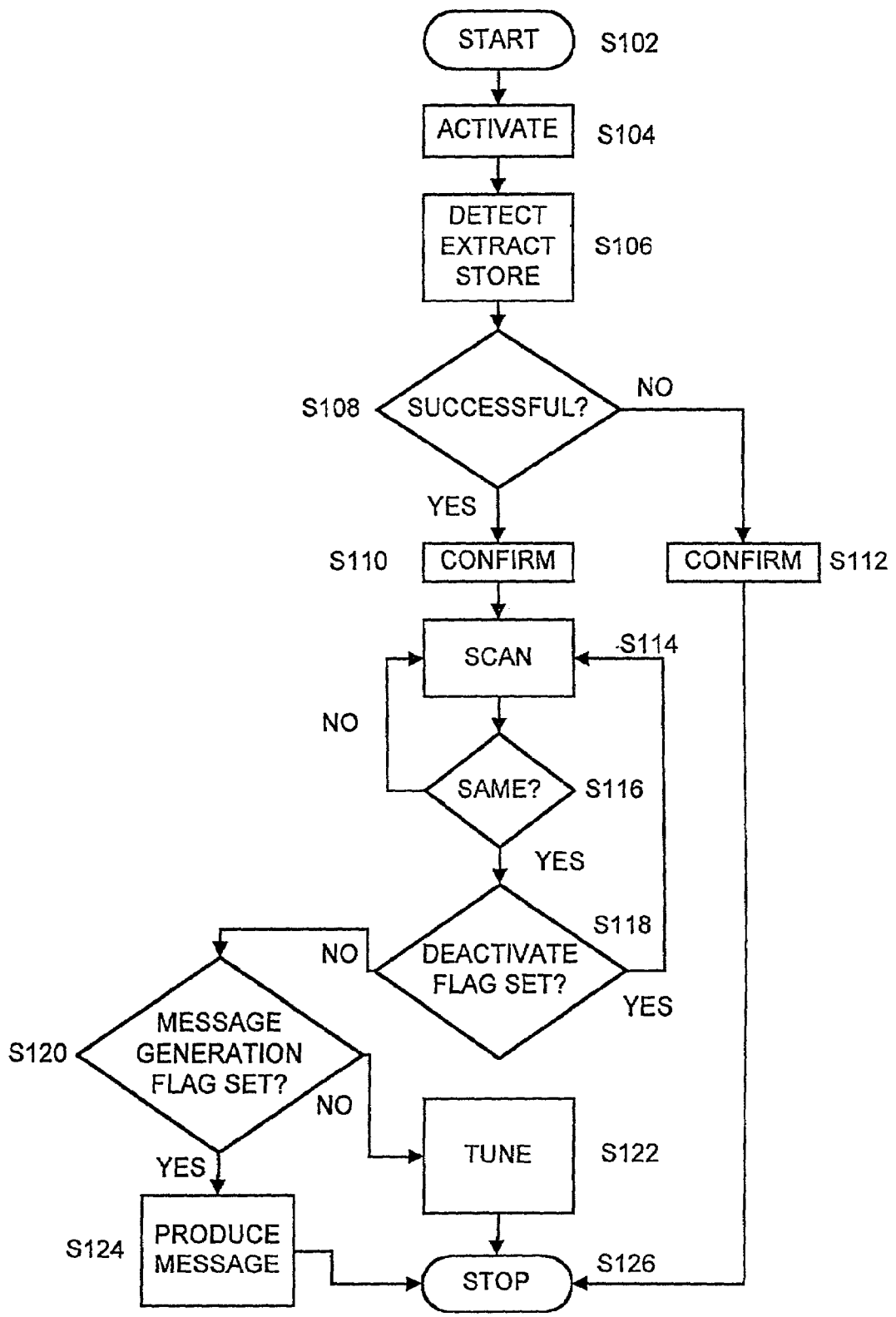
FIG. 1 is logic flow diagram depicting a general operation of a system in accordance with an exemplary embodiment of the present invention.

In one embodiment of the present invention, an ID code may be used for recognition purposes, wherein after the ID code is detected, it may be stored for use. The use includes comparisons with other detected sample ID codes. When a comparison indicates that a sample ID code is similar, or related, to that of the stored ID code, the system may be automatically tuned to the data stream that is carrying the signal having the sample ID code that may be similar, or related, to that of the stored ID code. A system may monitor either a single data stream, or alternatively, the system may monitor a plurality of data streams.

A general operation of a receiver system in accordance with an exemplary embodiment of the present invention may be described with reference to FIG. 1. At the start of the operation (S102), a person begins using the system. As an example, for the remainder of this general description, a television system will be used. However, it is noted that this general operation may additionally be used for any other receiver such as a: radio; computer; recorder standing alone, or connected to a television, radio, or computer; or set-top box connected to a television, radio, recorder, or computer.

While watching the television, a particular commercial may be aired that advertises a broadcast of another television program. If the broadcast is in the future and the viewer decides that he does not want to forget to view the program advertised in the commercial at the time the program is aired, or further, that the viewer does not want to be burdened by remembering when, or on what station, the program is aired, the viewer merely activates an automatic reminder system (S104). The automatic reminder system may compile the information into a database that the viewer can access, automatically tune a tuner, display a message on the television when the program time arrives, automatically program a recording device or take any other action to alert or make it easy for a viewer to remember to watch the program.

The system may be activated by pressing a button on the television itself, or on a corresponding remote control device.

The system may then detect, extract, and store an ID code being transmitted with the commercial (S106). Several methods of receiving, detecting, and extracting coded data are well established and may be used with the present invention. These methods however, have not been used in conjunction with a system for automatically tuning a receiver as is the case with embodiments of the present invention. Non-limiting examples include receiving, detecting, and extracting during the vertical blanking interval of the transmitted signal, during the closed captioned portion of the transmitted signal, or along an audio frequency sub-carrier of the transmitted signal described earlier. Furthermore, a method of receiving, detecting, and extracting the specific coded data may include receiving, detecting, and extracting from any portion of the transmitted signal, such as for example, a multiplexed or interlaced portion of the signal. Of course the options for receiving, detecting, and extracting the specific coded data may be limited by the particular system being used, which would be apparent to one of skill in the art. For example, a radio system would not have a vertical blanking interval, since there is no image signal. Furthermore, a computer may merely use a type of data multiplexing scheme.

One type of ID code, a repeating ID code, corresponds to a respective broadcast, and may be the same for every broadcast. A repeating code may be broadcast, for example, with a traffic portion of a news program. For example, a user may wish to view or listen only to the traffic portion of the news, and further, the user may not wish to miss any particular traffic portion for fear of missing important updates on accidents. Once a repeating ID code is detected and stored on a system in accordance with the present invention, the system will automatically tune to any data stream that is broadcasting a signal carrying the previously stored ID code.

Another type of ID code, a combination bait/capture code, corresponds to a respective broadcast, and may be different for at least two different broadcasts. In a first instance a bait ID code is broadcast with a first broadcast signal, wherein the first broadcast signal represents an indication of a second broadcast signal that is broadcast. Once the bait ID code is detected, the bait ID code, or a modified version of the bait ID code (for example, two's compliment), may be stored in the system. The second broadcast signal may be broadcast with a capture ID code, wherein either the modified version of the bait ID code matches the capture ID code, or in the alternative, the bait ID code matches a modified version of the capture ID code, the system in accordance with the present invention will automatically tune to the data stream that is broadcasting the signal carrying the capture ID code.

For example, in a sound byte advertising a radio station contest such as " . . . when you hear the following bell 'ding-ding-ding,' be our fourth caller and win a . . . ," a bait signal may be added to the sound byte in the broadcast signal. When a user stores this signal, the bait signal may be modified in a predetermined manner, prior to being stored, that will match the capture signal. Therefore, when the system compares the detected signals with the modified bait signal, which now resembles the capture signal, broadcasts advertising the giveaway will not activate the automatic tuning. In other words, by using the bait/capture embodiment, the system may prevent automatic tuning to an advertisement of a broadcast, but may be automatically tuned to the broadcast itself.

Many types of signals may be used as an ID code a system in accordance with the present invention, non-limiting examples include, audio, video, or broadcast signals that may be perceivable or non-perceivable by the user, or any mixture thereof For use with a radio, the present invention may, for example, use a code transmitted within a signal that may not be perceivable to the listener, such as a signal transmitted on audio frequency sub-carrier, as the ID code. Alternatively, for use with a radio, the present invention may use an availability indicator transmitted within a signal that may be perceivable to the listener, such as a sound bite, to indicate that an ID code is being transmitted for use by the receiver. An exemplary embodiment of such an availability indicator may include a sound byte. Further, embodiments of the present invention may use the availability indicator as the ID code. For use with a television or computer, the present invention may, for example, use a visual icon such as a station identification, as an availability indicator to indicate that an ID code is being broadcast. In yet another embodiment for use with a television or computer, the present invention may, for example, use an auditory signal perceivable by the user, with or without a visual availability indicator, to indicate that an ID code is being broadcast.

Figure 2:
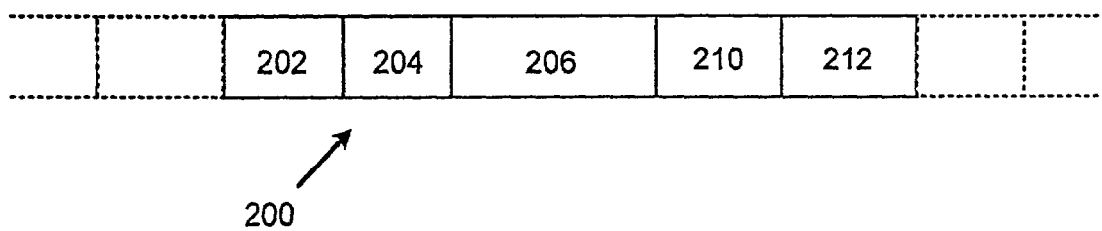
FIG. 2 is an exemplary embodiment of a general ID code system in accordance with the present invention.

A general ID code system may be implemented for use with multiple embodiments of an automatic reminder system in accordance with the present invention. An exemplary embodiment of a general ID code system is depicted in FIG. 2. Such as depicted in FIG. 2, 200 represents a general code string. The 200 code string includes a START CODE portion 202, a CODE TYPE portion 204, a program ID portion 206, an OTHER portion 210, and a STOP CODE portion 212. The START CODE portion 202, and the STOP CODE portion 212, as recognized by those of skill in the art, may be used by the receiving system as markers for identifying the respecting beginning and end of each code string. The OTHER portion 210 represents a portion of code that may be used for miscellaneous purposes, such as parity, encryption, and/or error correction. The remaining CODE TYPE portion 204, and the program ID portion 206 of the general code string 200 differentiate the many embodiments, and implementations of the present invention.

Figure 3:
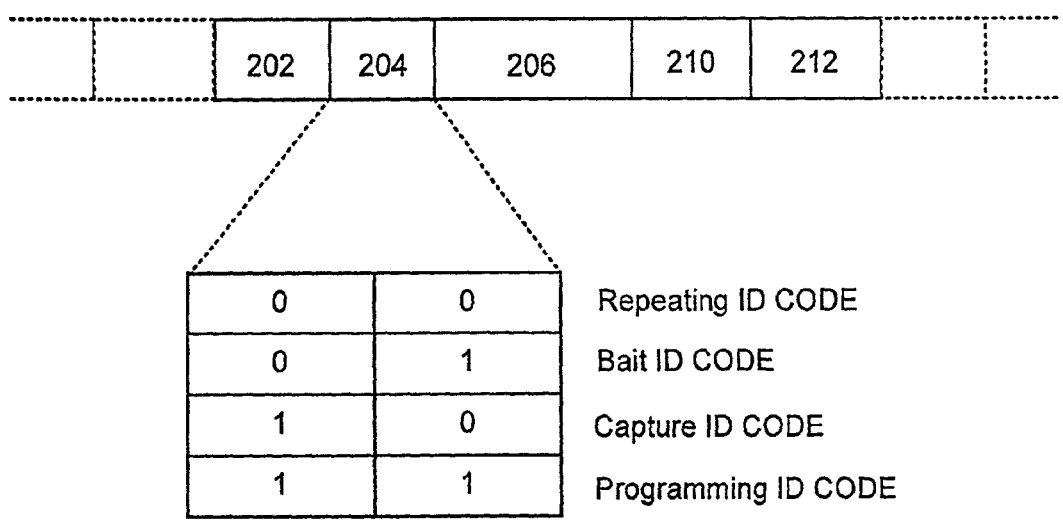
FIG. 3 is a blown up portion of an exemplary embodiment of a general ID code system in accordance with the present invention.

In an exemplary embodiment, as seen in FIG. 3, the CODE TYPE portion 204 may comprise a two-bit identifier for differentiating a repeating, bait, capture, or programming ID code. For example, a repeating ID code may be identified by a 00 in the CODE TYPE portion 204, a bait ID code may be identified by a 01 in the CODE TYPE portion 204, a capture ID code may be identified by a 10 in the CODE TYPE portion 204, and a programming ID code may be identified by a 11 in the CODE TYPE portion 204.

Figure 4A:
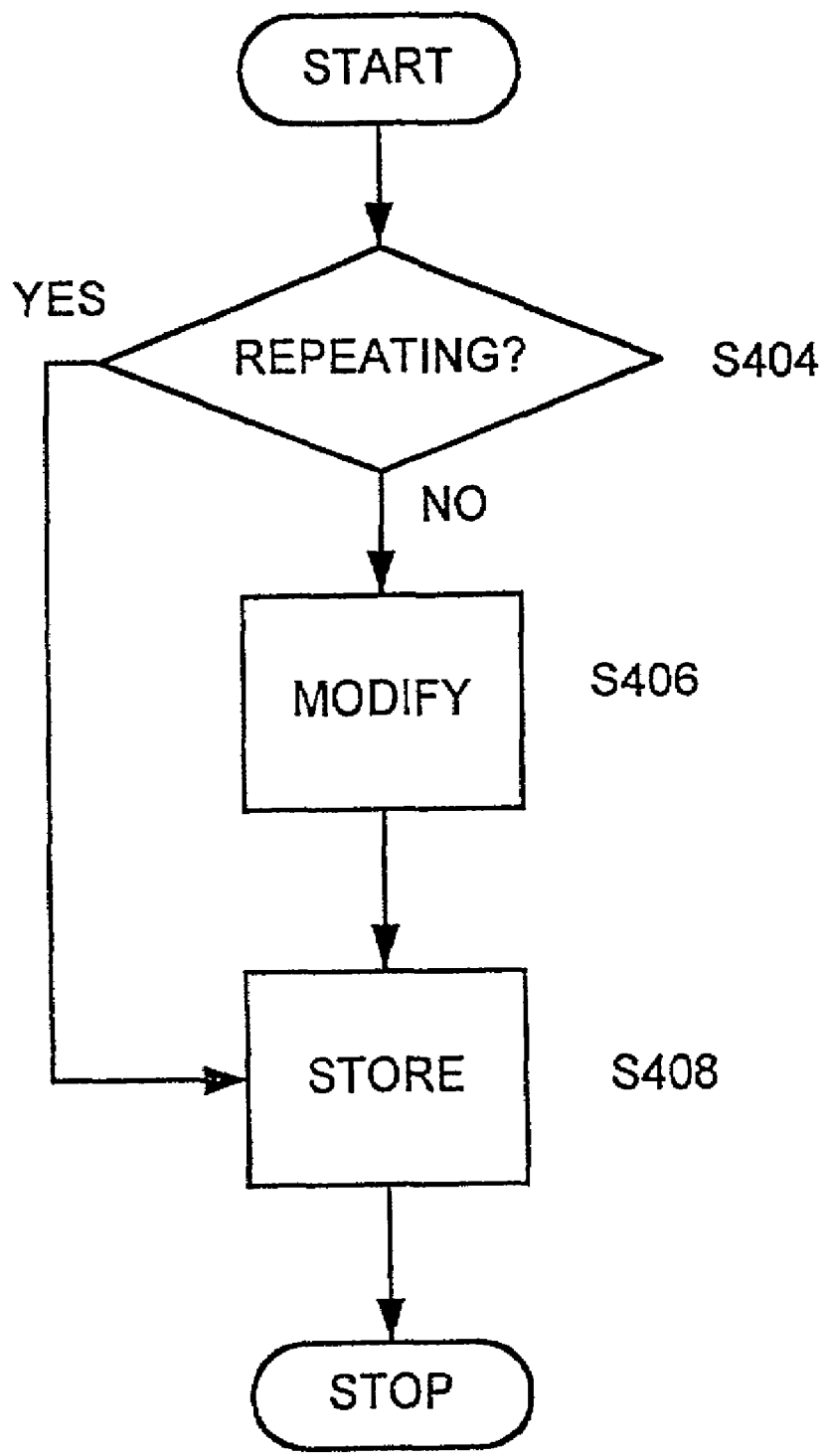
FIG. 4(a) is logic flow diagram for determining what type of ID code a detected ID code is, accordance with an exemplary embodiment of the present invention.

Further, depending on whether the ID code is a repeating ID code, or a bait ID code, the storage sequence may vary, such as depicted in FIG. 4(a). First it may be determined whether the ID code is a repeating ID code or a bait ID code (S404). Differentiating between a repeating ID code, and a bait ID code, may be accomplished by any differentiating technique, non-limiting examples of which may include differing number of bits, or different starting bit, etc. When the ID code is a repeating ID code, i.e. a code that will activate automatic tuning when the same code is detected, the ID code may be automatically stored (S408). However, when the ID code is a bait code, i.e. a code that will not activate automatic tuning when the same code is detected, the ID code may be modified prior to storing (S406). Modification techniques may include any industry-accepted technique, non-limiting examples of which may include taking a two-complement, or adding a bit or bits of code. Once the bait ID code is modified (S406), the modified bait ID code (that will match a respective capture ID code) may be stored (S408).

Figure 4B:
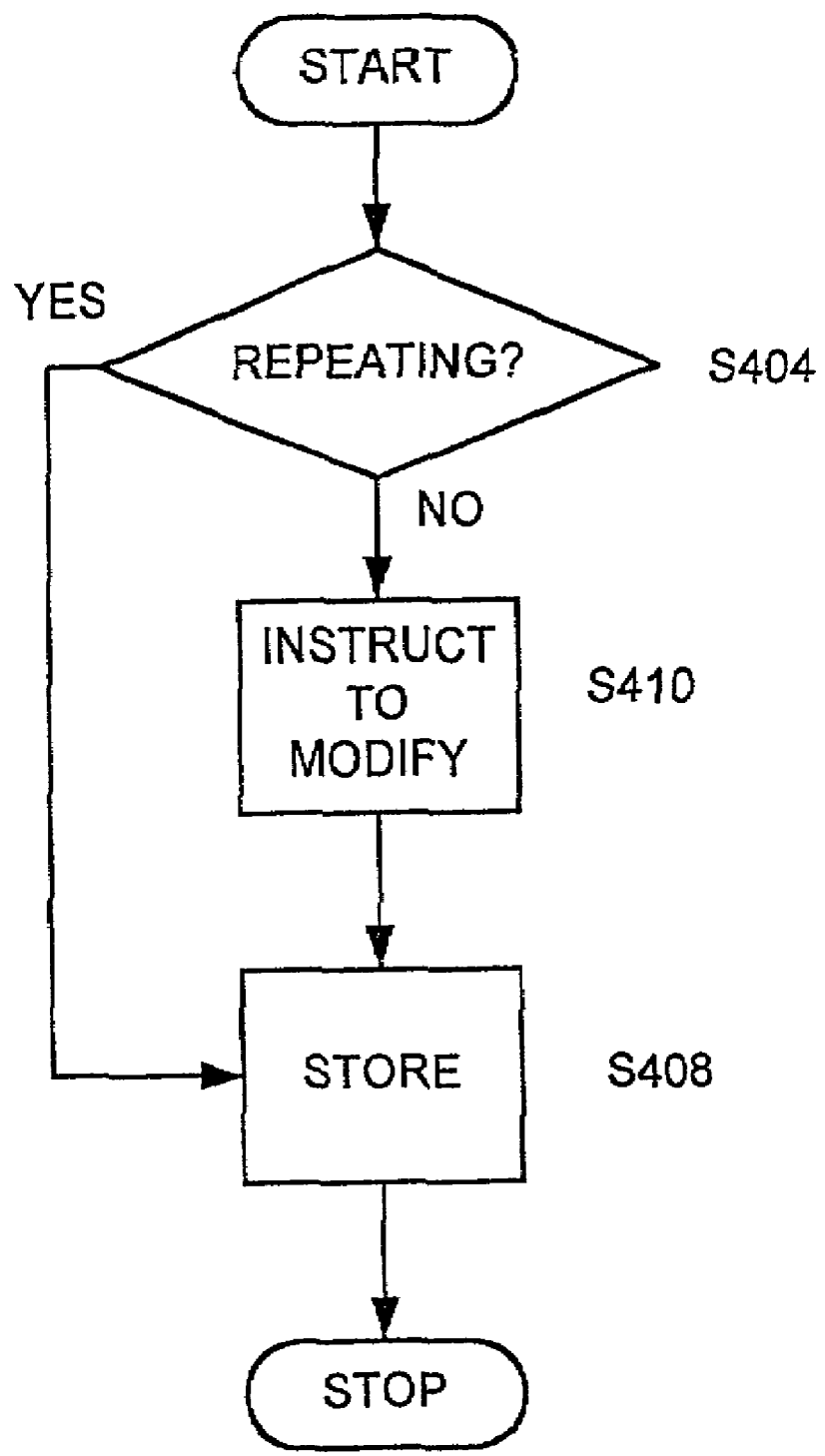
FIG. 4(b) is logic flow diagram for determining what type of ID code a detected ID code is, accordance with another exemplary embodiment of the present invention.

FIG. 4(b) represents a logic flow diagram in accordance with an alternative embodiment, wherein if the detected ID code is determined to be a bait code, it is not modified. Similar steps in both FIG. 4(a) and FIG. 4(b) are similarly numbered. When the ID code has been determined to be a bait code (S404), i.e. a code that will not activate automatic tuning when the same code is detected, the auxiliary receivers are instructed to modify any capture codes prior to sending to the comparator (S410). Modification techniques may include any industry-accepted technique, non-limiting examples of which may include taking a two-complement, or adding a bit or bits of code. The detected bait code may then be stored as detected (S408).

Returning back to FIG. 1, if it has been determined that the ID code has been successfully stored (S108), the user receives a confirmation indicator indicating such (S110). Non-limiting examples of confirmation indicators include visual indicators (such as video images on the screen of the receiver, or an LED on the receiver), and/or audio indicators. Similarly, if it has been determined that the ID code has not been successfully stored (S108), the user receives a confirmation indicator indicating such (S112) and the operation stops (S122). However, it has been determined that the ID code has been successfully stored (S108), the system may then scan for sample ID codes (S114).

In one type of embodiment of a device used for the scanning step (S114) as described in FIG. 1, at least one auxiliary receiver within the system continuously monitors a predetermined number of data streams. If the predetermined number of data streams is more than one, the monitoring may more accurately be described as scanning.

Figure 5:
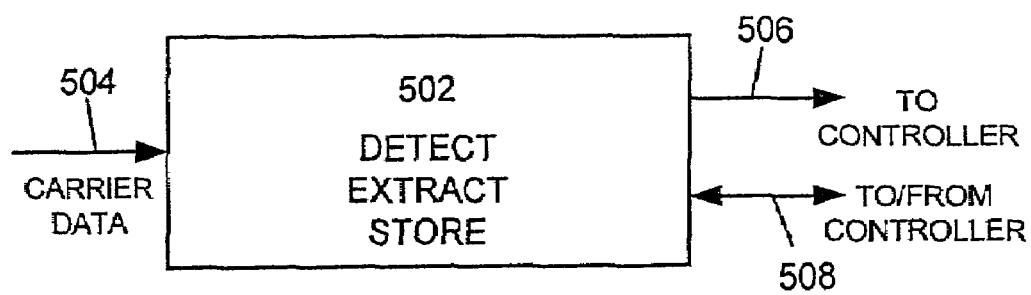
FIG. 5(a) is an exemplary auxiliary receiver in accordance with the present invention.
FIG. 5(b) is another exemplary auxiliary receiver in accordance with the present invention.
Figure 5:
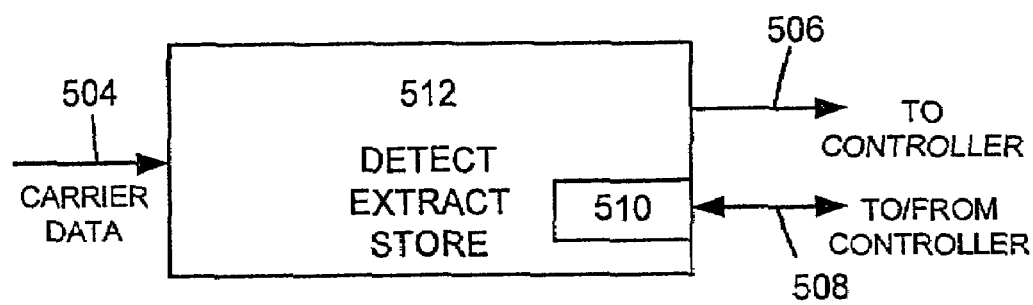

An exemplary auxiliary receiver in accordance with the present invention is depicted in FIG. 5(A). As seen in FIG. 5(A), the auxiliary receiver 502, which may be a data processor, receives data stream data at input 504. The ID code may be detected and extracted from the data stream data at the auxiliary receiver 502, and the ID code may be then sent to a controller (not shown) by way of an output port 506. Further, the auxiliary receiver 502 receives instruction data from the controller (not shown) at port 508, wherein the instruction data indicates to the auxiliary receiver to what data stream to tune. In an embodiment wherein the auxiliary receiver 502 monitors a single data stream, the instruction from the controller may stay unchanged until the user reprograms a new ID code. Alternatively, in an embodiment wherein the auxiliary receiver 502 scans a plurality of data streams, the instruction from the controller may continuously change. In the exemplary auxiliary receiver, such as depicted in FIG. 5(A), a memory for storing information relating to the data streams for which the auxiliary receiver 502 may be tuned is not shown. Such a memory may be stand alone or located in, or as part of, the controller, not shown.

Another exemplary auxiliary receiver in accordance with the present invention is depicted in FIG. 5(B). Features of the auxiliary receiver as seen in FIG. 5(B) that are similar to features of the auxiliary receiver as seen in FIG. 5(A) are similarly numbered. Such as depicted in FIG. 5(B), the auxiliary receiver 512 receives instruction data from the controller (not shown) at port 508, wherein the instruction data that indicates to the auxiliary receiver to what data streams to tune, may be stored in a memory 510. In an embodiment wherein the auxiliary receiver 502 monitors a single data stream, the data in memory 510 may stay unchanged until the user reprograms a new ID code. Alternatively, in an embodiment wherein the auxiliary receiver 512 scans a plurality of data streams, the memory may be continuously updated.

In an exemplary embodiment of a device used for the scanning step (S114) as described in FIG. 1, using a single auxiliary receiver, such as for example, as depicted in either FIG. 5(A) or 5(B), the time t, is the time spent detecting and extracting a sample ID code from a data stream, and for comparing the sample ID code with the previously stored ID. The time t may be may be influenced by the frequency at which the sample ID code is broadcast, in addition to the processing speed of the receiver.

The total number of data streams that the auxiliary receiver will scan is n. The total number of data streams n may be determined in accordance with desired design constraints of the receiver. One of skill in the art may make receivers that scan (monitor) only a single data stream for a carried signal. Such a receiver may be useful when it would be impractical to scan the entire spectrum for a specific type of signal that would probably only be broadcast on a single data stream. Further, one of skill in the art may make receivers that scan every data stream within a predetermined spectrum for carried signals. Such a receiver may be useful when it would be unknown as to which data stream a specific type of signal may be broadcast, and when it would be unknown as to which data streams would carry signals above a specific threshold (such as traveling in an automobile across great distances). Still further, one of skill in the art may make receivers that pre-scan the predetermined spectrum and thereafter only scan the specific data streams within the predetermined spectrum that have been determined during the pre-scan to carry a signal above a specific threshold. Such a receiver may be useful to efficiently scan only the data streams that carry a signal to the receiver having a signal strength above a predetermined threshold.

The total time T for an auxiliary receiver to compare sample ID codes from all the data streams that are scanned as determined by the design of the system is tn. Therefore, in order to decrease the total time T, or in other words, in order to decrease the response time of an automatic reminder system in accordance with the present invention, either time t spent detecting and extracting a sample ID code from a data stream, and for comparing the sample ID code with the previously stored ID code must be decreased and/or the total number of data streams to be scanned n must be decrease.

Of course, time t may be decreased with a system having a type of statistical error detection. For example, a receiving system in accordance with the present invention may be provided that serially checks the sample ID code from a data stream against the previously stored ID code. At any time, prior to checking an entire data length of the sample ID code, the system may determine that the sample ID code is not similar to the previously stored ID code. In such an event, the system may skip to the next data stream for detection and comparison, thereby decreasing the amount of time spent comparing the detected signal.

Another exemplary embodiment of a device used for the scanning step (S114) as described in FIG. 1, of an embodiment of the present invention, may include a plurality of auxiliary receivers to scan the data stream spectrum. This may increase the price of the system over that of one auxiliary receiver, however, the response time in which the system may automatically tune to a specific data stream may be decreased over that of one auxiliary receiver, since the total amount of time T spent detecting all the data streams would be divided by the number of auxiliary receivers. Therefore, the number of auxiliary receivers will proportionately decrease the amount of time needed to detect and compare a particular data stream.

Of course as with the exemplary embodiment using one auxiliary receiver as described above, when using a plurality of auxiliary receivers this time may be decreased with a system having statistical error detection.

Again, the sample ID code may be a repeating ID code, or a capture ID code (that corresponds to a previously stored bait ID code). As for differentiating between a repeating ID code, and a capture ID code, any industry-accepted technique may be used, non-limiting examples of which may include differing number of bits, or different starting bit, etc. In accordance with multiple embodiments of the present invention, unless a sample ID code is received that matches the stored ID code, the system may continue to scan for sample ID codes.

Returning back to FIG. 1, when a sample ID code is received (S114), the sample ID code may be compared with the previously stored ID code (S116). If the two ID codes are not similar, the system continues to scan for sample ID codes (return to S114). If the sample ID code and the previously stored ID code are similar, the system then checks to see if a deactivation flag has been set (S118).

A system in accordance with the present invention may include a deactivation system. The deactivation system would prevent the receiver from automatically tuning to a data stream upon detection of an ID code. An exemplary use of the deactivation system would include an instance when a person is viewing a program on a television that he does not want to be interrupted by an automatic tuning to another channel. Furthermore, once a system in accordance with the present invention automatically tunes the receiver to a frequency broadcasting a desired signal, the user may not want the system to automatically tune to another frequency for a specific period of time. This period of time may be specified by the user or programmed in the system. Still further, the system may have a deactivation for a specific ID code or a universal deactivation for all ID codes.

A deactivation flag may be set when the receiver receives an instruction, for example by way of a button located on the receiver itself or on a corresponding remote control unit. For example, if a user is watching a program on the television that he does not want to interrupt, he may deactivate the automatic reminder system of the receiver. Further, other embodiments of the present invention would enable a user to deactivate an automatic reminder system upon detection of ID codes that match specific previously stored ID codes, in addition to deactivate portions of the system thereby preventing the automatic reminder system from automatically tuning upon detection of ID codes that match any previously stored ID codes.

An exemplary embodiment of deactivation system includes a system, which, once activated, prevents automatic tuning upon detection of any ID codes.

Another exemplary embodiment of a deactivation system includes a system, which, once activated, prevents automatic tuning upon detection of specific ID codes determined by the user.

Yet another exemplary embodiment of a deactivation system includes a system, which, once activated, prevents automatic tuning upon detection of ID codes for a predetermined period of time set by the user.

Still yet another exemplary embodiment of a deactivation system includes a system, which, once activated, prevents automatic tuning upon detection of ID codes for a predetermined period of time not set by the user.

Returning again back to FIG. 1, if a deactivation flag has been set (S118), then the system again continues to scan for ID codes (return to S114). If a deactivation flag has not been set, the system may check whether a message generation flag has been set (S120).

A system in accordance with the present invention may include a message generation system. The message generation system would, as an alternative to automatically tuning to a data stream upon detection of an ID code, merely provide a message when the program time arrives or take any other action to alert or make it easy for a user to remember that a program is being broadcast. An exemplary use of the message generation system would include an instance when a person is viewing a program on a television that he does not want to be interrupted by an automatic tuning to another channel, wherein the viewer may receive a text massage overlaying, or formed in a window of, the current program. As such, the user may elect to be reminded by a message or have the system automatically tune to the program.

A message generation flag may be set when the receiver receives an instruction, for example by way of a button located on the receiver itself or on a corresponding remote control unit. For example, if a user is watching a program on the television that he does not want to interrupt, he may choose a message or reminder option rather than an automatic tuning option of the receiver. Further, other embodiments of the present invention would enable a user to deactivate a message generation system upon detection of ID codes that match specific previously stored ID codes, in addition to deactivate portions of the system thereby preventing the message generation system from automatically reminding upon detection of ID codes that match any previously stored ID codes.

If the system does not include a message generation system, or if the message generation flag has not been set (i.e. the user has not chosen the message reminder option) the receiver may be automatically tuned to the data stream (in this instance, a channel) that is carrying the matching sample ID code (S122). Then the operation stops, wherein the viewer is able to view the broadcast that was previously advertised (S126).

If the system includes a message generation system, and the message generation flag has been set (i.e. the user has chosen the message reminder option) a controller sends an instruction to a display generator to produce the message on the screen (S124) for the viewer. Then the operation stops, wherein the viewer is informed that the desired program is being broadcast, and on what data stream it is being broadcast (S126).

In operation, while monitoring a data stream, an auxiliary receiver detects and extracts a sample ID code from the signal on the data stream. The system then compares the sample ID code from the signal on the data stream with the previously stored ID code. When an auxiliary receiver detects a sample ID code matching that of the previously stored ID code, the receiver may be automatically tuned to the data stream that the auxiliary receiver is tuned or the receiver may remind the user that the program is being broadcast.

Still another exemplary embodiment of a device in accordance with the present invention, used for the scanning step (S114) as described in FIG. 1, may include a station preset button that enables the user to preset the data streams that will be scanned for the predetermined detected signal. For use in a radio environment for example, there are only a limited number of allotted broadcast frequencies within a FCC zoned area. Within any number of allotted broadcast frequencies, there may be yet a much smaller sample of any particular broadcast format or genre. Similarly, for use in a television environment, there may be only one television station that broadcasts a specific program to which the user wishes the present invention to automatically tune. Consequently, scanning the entire frequency spectrum may waste time and energy if the predetermined signal will not be broadcast on many of the allotted broadcast frequencies within a given area. Therefore by permitting the user to preset the relatively few broadcast frequencies that may potentially broadcast the predetermined detected signal, the cost of the receiving system may be drastically reduced. Still further, by presetting the system to only scan one frequency, for example the frequency on which the predetermined detected signal is broadcast, the cost of the receiving system may be drastically reduced. The reduction in cost may be reflected in the decrease in the needed auxiliary receivers.

In operation, a person uses a system, for example a television in accordance with an embodiment of the present invention, when watching a particular broadcast program. During the particular broadcast program, a commercial or advertisement for a broadcast program may air. At this time, an ID code may be broadcast with the commercial or advertisement, wherein the ID code may be affiliated with the broadcast program. If the person wishes to view the program, he would activate the system to detect, and store the ID code. The system would then repeatedly scan the data streams, in this case, the channels, as described above until a signal is found that is similar, or related, to the ID code. When the signal is found, i.e. the program as described in the commercial or advertisement is broadcast, the television will automatically tune to the respective channel broadcasting such program.

Accordingly, the present invention promotes easy programming for automatically recalling a television to a specific channel in order to view a particular program. With a system in accordance with the present invention, a person need not remember, or even know, the channel and time of a broadcast for a particular program he wishes to watch. With a system in accordance with and embodiment of the present invention, a person need only view a commercial or advertisement having an ID code, and activate the system when viewing the commercial.

The above example is not used to limit the scope of the present invention; it is used merely for the purpose of describing one of many embodiments of the present invention. For example, the system may be a radio, and the pre-programmed signal may be a song or sound bite. Therefore, if a person would like to hear a particular song every time it is played on the radio, he would just activate the system when the song is playing to detect and record the ID code that is broadcast with the song. As another example, the system may be recording device for recording a program from a television or radio. As still another example, the system may be a set-top box, for permitting a preexisting television or radio to emulate a television or radio in accordance with the present invention. As yet another example, the system may be computer that receives television or radio signals. Furthermore, the broadcast signal may be a particular advertisement, or a sound byte indicating the commencement of a particular broadcast such as " . . . and now we will turn to traffic news."

Still yet another exemplary embodiment of a device in accordance with the present invention, used for the scanning step (S114) as described in FIG. 1, may include a single-data stream-monitoring device. With respect to recognition purposes, wherein the system monitors a single data stream, such an embodiment is efficient in operation and design. In the single-data stream-monitoring embodiment, after a user instructs the system to detect and store an ID code being transmitted on the current data stream, the system will thereafter only monitor that particular data stream. As such, there is no need to scan a plurality of data streams.

This single-data stream-monitoring embodiment may be preferred in a system wherein a large number of data streams may possibly be monitored. For example, a cable television provider may provide an excess of one hundred channels. It is possible that a particular program, which a user may want to view, would only be broadcast on a single channel within the total spectrum of channels. Scanning all the channels for the ID code constantly, in such an instance, would be wasteful. Therefore, the single-data stream-monitoring embodiment may be preferred because the system would only monitor the particular channel in which the ID code was originally detected.

In operation, a person uses a system in accordance with the single-data stream-monitoring embodiment of the present invention, for example a television, when watching a particular broadcast program. During the particular broadcast program, a commercial or advertisement for a broadcast program that may air. At this time, an ID code may be broadcast with the commercial or advertisement, wherein the ID code may be affiliated with the broadcast program. If the person wishes to view the program, he would activate the system to detect, and store the ID code. The system would then repeatedly monitor the particular data stream that carried the ID code when it was detected, in this case, the particular channel that was being watched when the ID code was detected, as described above until a signal is found that is similar, or related, to the ID code. When the signal is found, i.e. the program as described in the commercial or advertisement is broadcast, the television will automatically tune to the respective channel broadcasting such program.

In yet another embodiment, there is no need for scanning of any data streams. In this embodiment, the ID code includes an automatic programming instruction for the respective receiving device.

Figure 6:
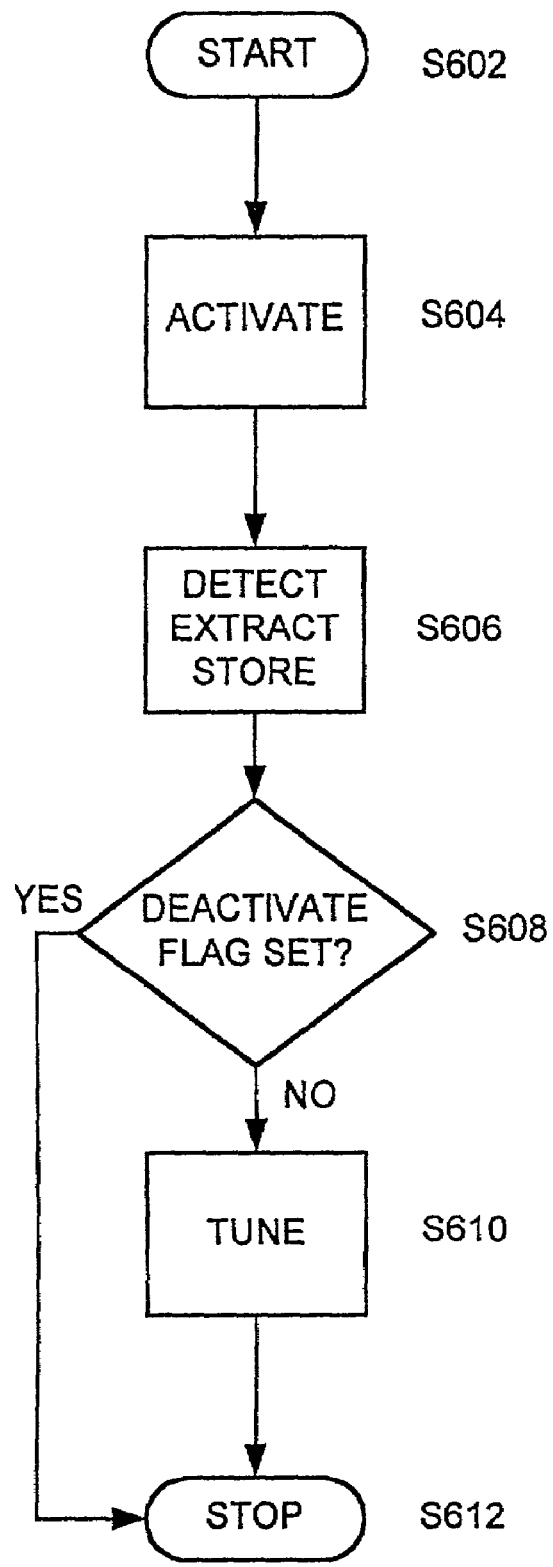
FIG. 6 is a logic flow diagram describing a general operation of a system in accordance with another exemplary embodiment of the present invention.

A general operation of a system in accordance with another exemplary embodiment of the present invention may be described with reference to FIG. 6. At the start of the operation (S602), a person begins using the system, for example viewing a television (as an example, for the remainder of this general description, a television system will be used. However, it is noted that this general operation may additionally be used for a radio, recorder, computer, or set-top box). While watching the television, a particular commercial may be aired that advertises a broadcast of another television show. If the viewer decides that he does not want to forget to view that show at the time it is aired, or further, that he does not want to remember when it will be aired, he merely activates the automatic reminder system (S604). Activation may be by pressing a button on the television itself, or on a corresponding remote control device. The system then receives an ID code being transmitted with the commercial (S606). Methods of transmitting and subsequently receiving, detecting, and extracting data that is transmitted along with a video and/or audio signal that may be used with the present invention are well known in the art. Such methods include transmitting data during the vertical blanking interval of the program signal, during the closed captioned portion of the program signal, or along an audio frequency sub-data stream described earlier. Furthermore, a computer may merely use a type of data demultiplexing scheme. The ID code in this instance, instructs the television when to turn to the specific data stream (or when to remind the user that the program is being broadcast on that specific data stream).

FIGS. 7(A)-7(G) represents further descriptions of exemplary embodiments of the program ID portion 206.

FIG. 7(A) is an exemplary embodiment wherein the program ID portion 206 may entirely be used to describe a specific program.

FIGS. 7(B)-7(G) are exemplary embodiments of a programming ID code. As seen in FIGS. 7(B)-7(G), the program ID portion 206 may comprise a first portion 701, and a second portion 702. The first portion 701 indicates the programming type of code, wherein the second portion 702 indicates programming instruction.

One type of automatic programming instruction may include a date/time stamp. This date/time stamp indicates to the receiving system when to tune to the respective data stream that the system was originally tuned to when the ID code was detected and stored. As such, when the ID code is detected and stored, the receiving system reads the date/time stamp, which may be used by a processor for automatically preprogramming the system to automatically tune the that particular data stream at the time dictated by the date/time stamp.

FIG. 7(B) represents an exemplary application of the program ID portion 206, wherein the programming type of code indicated by the first portion 701 may be a Date/Time programming ID code, and wherein the specific date and time information may be in the second portion 702. With an exemplary programming type of code, such as depicted in FIG. 7(B), the receiver may be instructed to tune to the data stream, that carried the ID code when the receiver stored the ID code, at the date and time as instructed in the second portion 702. An exemplary application of an ID code, such as depicted in FIG. 7(B) may be particularly useful when the receiver has recording capabilities, and when the broadcast has an undetermined length of broadcast time.

Another type of automatic programming instruction may include a date/time/duration stamp. This date/time/duration stamp indicates to the receiving system when, and for how long, to tune to the respective data stream that the system was originally tuned to when the ID code was detected and stored. As such, when the ID code is detected and stored, the receiving system reads the date/time/duration stamp, which may be used by a processor for purposes such as automatically preprogramming the system to automatically tune the that particular data stream at the time, and for the duration, dictated by the date/time/duration stamp.

FIG. 7(C) represents an exemplary application of the program ID portion 206, wherein the programming type of code indicated by the first portion 701 may be a Date/Time/Duration programming ID code, and wherein the specific date, time, and duration information may be in the second portion 702. With an exemplary programming type of code, such as depicted in FIG. 7(C), the receiver may be instructed to tune to the data stream, that carried the ID code when the receiver stored the ID code, at the date, time and for the duration as instructed in the second portion 702. A modified exemplary embodiment is depicted in FIG. 7(D) wherein the time and duration information may be replaced with a time-to-start and a time-to-stop information. Further, an exemplary application of an ID code, such as depicted in either FIG. 7(C), or FIG. 7(D), may be particularly useful when the receiver has recording capabilities, and when the broadcast has an known length of broadcast time.

FIG. 7(E) represents an exemplary application of the program ID portion 206, wherein the programming type of code indicated by the first portion 701 may be a Date/Time/Data stream programming ID code, and wherein the specific date, time, and data stream information may be in the second portion 702. With an exemplary programming type of code, such as depicted in FIG. 7(E), the receiver may be instructed to tune to the data stream as instructed in the second portion 702, at the date and time as instructed in the second portion 702. An exemplary application of an ID code, such as depicted in FIG. 7(E), may be particularly useful when the receiver has recording capabilities, when the broadcast is on a data stream that may be different from the data stream that broadcast the ID code originally, and when the broadcast has an undetermined length of broadcast time.

FIG. 7(F) represents an exemplary application of the program ID portion 206, wherein the programming type of code indicated by the first portion 701 may be a Date/Time/Duration/Data stream programming ID code, and wherein the specific date, time, duration, and data stream information may be in the second portion 702. With an exemplary programming type of code, such as depicted in FIG. 7(F), the receiver may be instructed to tune to the data stream as instructed in the second portion 702, at the date, time and for the duration as instructed in the second portion 702. A modified exemplary embodiment is depicted in FIG. 7(G) wherein the time and duration information may be replaced with a time-to-start and a time-to-stop information. An exemplary application of an ID code, such as depicted in either FIG. 7(C), or FIG. 7(D), may be particularly useful when the receiver has recording capabilities, when the broadcast is on a data stream that may be different from the data stream that broadcast the ID code originally, and when the broadcast has a known length of broadcast time.

Returning back to FIG. 6, the system then checks to see if a deactivation flag has been set (S608). If a deactivation flag has been set, then the system stops or takes any other action indicated by the user, such as providing by a text overlay message on a television screen (S612). If a deactivation flag has not been set, the system may be automatically tuned to the data stream (in this instance, channel) at the time instructed by the ID code (S610). Then the operation stops, wherein the viewer may be able to view the broadcast that was previously advertised (S612).

Furthermore, one aspect of the present invention includes having either a single or plurality of storage banks for different ID codes. With respect to a radio, for example, a user may desire the system to automatically tune to any one of a plurality of broadcast signals, any one of which may be a favorite song, a traffic report, a news report, a station giveaway, etc. Such may be accomplished by using a plurality of storage banks, each for storing at least one ID code. Similarly, with respect to a television, for example, a user may desire the system to automatically tune to any one of a plurality of broadcast signals, any one of which may be a favorite program, a portion of a program, such as a traffic report or weather report within a news report, an entertaining commercial, a music video, etc. Such may be accomplished by using a plurality of storage banks, each for storing at least one ID code.

Further, a system in accordance with the present invention may include a method or system for prioritizing the signals represented by the respective plurality of ID codes. Such a prioritizing method or system would determine which data stream the system would tune to in the event that more than one ID code is detected on more than one data stream. In addition, a second prioritizing method or system may be used in the event that a particular ID code is detected on two different data streams. Factors used in prioritizing may include signal strength, order of storage, and time of storage of the ID code.

Furthermore, an availability indicator may be broadcast with the program in order to indicate to a user that the program is additionally broadcasting an ID code. Non-limiting examples of availability indicators may include: visual icons, such as station/channel/web site identification marks or weather or traffic report marks that are superimposed on the video monitor during transmission of the respective identifying program; or audio sound bites that are superimposed over the audio signal during transmission of the respective identifying program.

Still further, an availability indicator may be broadcast with the program may itself be an ID code. Non-limiting examples of availability indicators may include: visual icons, such as station/channel/web site identification marks or weather or traffic report marks that are superimposed on the video monitor during transmission of the respective identifying program; or audio sound bites that are superimposed over the audio signal during transmission of the respective identifying program.

Yet another aspect of the present invention provides an indication device informing the user of many operating parameters of the system.

Reference will now be made in detail to a preferred embodiment of the invention, an example of which is illustrated in the accompanying drawings.

The following exemplary embodiment, includes a receiving system having a plurality of auxiliary receiver, each for scanning a plurality of data streams in an interlaced fashion. One of skill in the art, after reading the present disclosure, would know how to implement the remaining embodiments as described above in light of the following embodiment.

Exemplary Embodiment

Figure 8A:
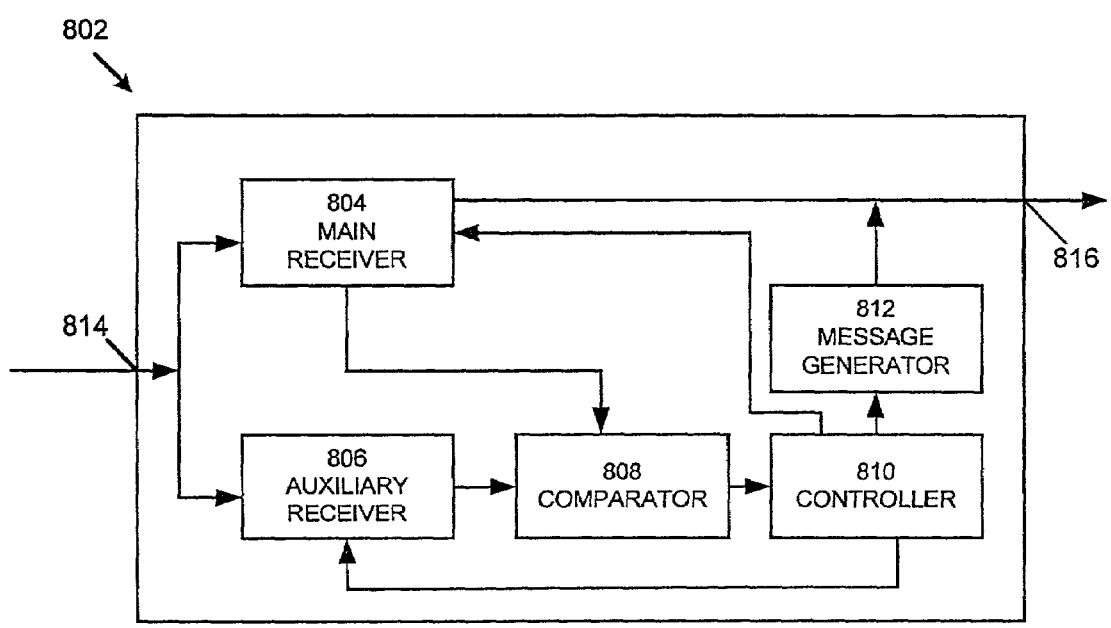
FIG. 8(a) is an exemplary embodiment of a receiving system in accordance with the present invention.

FIG. 8(a) is an exemplary embodiment of a receiving system in accordance with the present invention. As seen in FIG. 8(a), the receiving system 802, may include a main receiver 804 for receiving a spectrum of data streams that carry data signals; an auxiliary receiver 806 for scanning the spectrum of data streams; a comparator 808 for comparing data; a controller 810 for controlling the auxiliary receiver 806 and receiver unit 804, an input 814 for inputting the spectrum of data streams into the main receiver 804, and the auxiliary receiver 806; a message generator 812 for generating a reminder message for a user; the and an output 816 for outputting the signal to a respective video and/or speaker.

The main receiver 804 and the auxiliary receiver 806 receive data streams that carry data signals from a spectrum of data streams from the input 814. The input 814 may be any input source, non-limiting examples of which include an antennae, coaxial cable, data line, etc. The main receiver 804, when instructed by a user, detects, extracts, and stores an ID code from the signal on the data stream.

Storage may be: in the receiver, in the comparator, in the controller, or storage may take the form of a memory separate from that of the receiver, comparator, or controller. Further, storage may be adapted to permit storage of a plurality of ID codes. In the present exemplary embodiment, the main receiver includes a memory for storing a plurality of ID codes.

Once the ID code has been stored, the auxiliary receiver 806 scans the spectrum of data streams (unless the embodiment is one in which the auxiliary receiver 806 actually only scans a particular set of data streams as described above) for ID codes. The auxiliary receiver 806 then detects, extracts, and sends such ID codes to comparator unit 808.

Figure 8B:
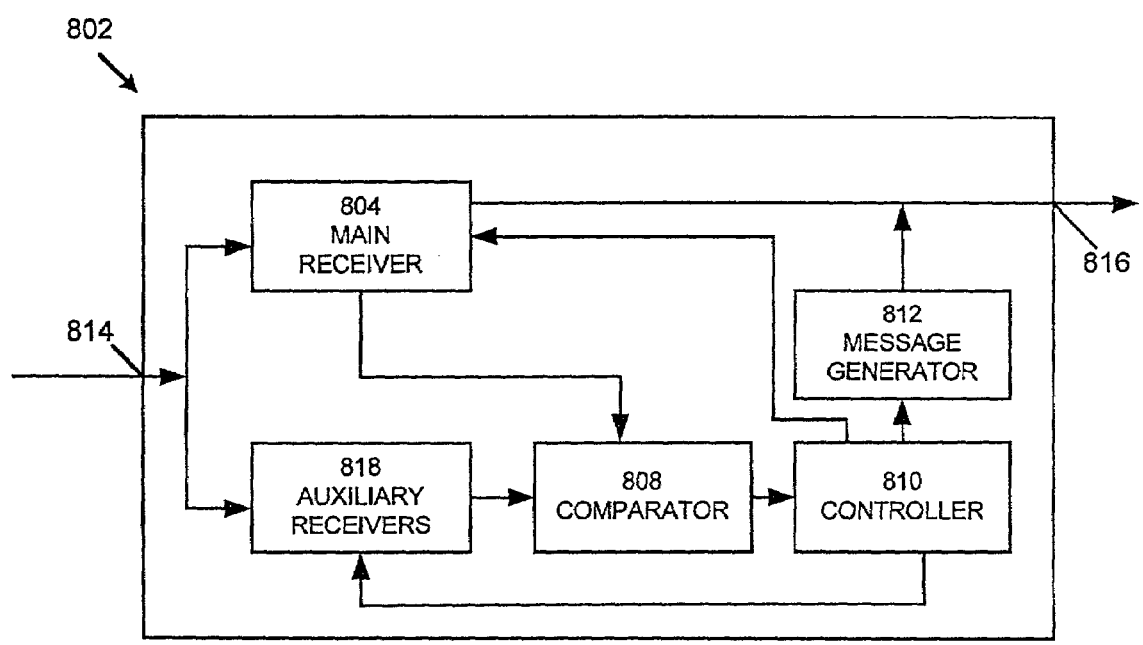
FIG. 8(b) is another exemplary embodiment of a receiving system in accordance with the present invention.

FIG. 8(b) is a modified exemplary embodiment similar to that as depicted in FIG. 8(a). The receiving system 802, as seen in FIG. 8(b), however has a plurality of auxiliary receivers 818. As such, the time for the plurality of auxiliary receivers to scan the spectrum of data streams is inversely proportional to the number of auxiliary scanners.

Figure 9A:
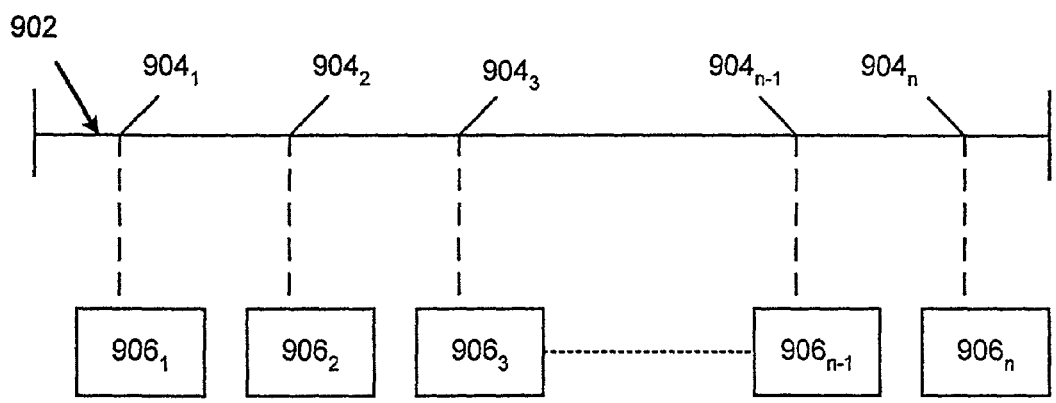
FIG. 9(a) depicts operation of a plurality of auxiliary receivers at a time $t_1$, in accordance with an exemplary embodiment of the invention.

FIG. 9(a) depicts operation of a plurality of auxiliary receivers, in accordance with an exemplary embodiment of the invention. As seen in FIG. 9(a) a plurality of auxiliary receivers $906_1$-$90_n$ each monitor a respective data stream $904_1$-$904_n$ on the data stream spectrum 902 at a time $t_1$. Each auxiliary receiver detects, extracts, a respective ID code from the signal on a respective data stream and sends the detected ID code to comparator 808. Further, other embodiments of the present invention may include a memory in the auxiliary receivers or a memory separate from that of the auxiliary receivers to permit storage of the respective detected ID codes.

Comparator 808 then compares the ID code as previously stored by the receiver 804, with the other ID codes detected by the auxiliary receiver 806, and sends the comparison output to the controller unit 810.

If the comparison output dictates that the ID codes match, if the deactivation flag has not been set, and if the message generation flag has not been set (or if there is not message generation system) the main receiver 804 is instructed to automatically tune to the data stream which the auxiliary receiver 806 is tuned. As such, the main receiver 804 is automatically tuned to the data stream carrying the matching ID code as detected by the auxiliary receiver 806. The new received signals are then output at output 816 for viewing and/or listening by the viewer.

If the comparison output dictates that the ID codes match, if the deactivation flag has not been set, if there is a message generation system, and if the message generation flag has been set, the message generator 812 is instructed to send a message to the receiver at output 816 for viewing and/or listening by the viewer. Non-limiting examples of messages generated by the message generator include audible (in the case of a radio or television for example) or visual (in the case of a television for example) indicators such as an audible beep or visual icon, or audible beep with a visual icon. Further the message generator may generate a message on the screen of the television, such as for example, "The program that you wanted to view is now on channel 13", or audibly indicate on from the speakers of the television or the radio a similar reminder.

In the event that the auxiliary receiver 806 is actually a plurality of auxiliary receivers, if the comparison output dictates that the ID codes match, then the controller determines which auxiliary receiver detected the ID code matching that of the previously ID code. Once the identity of the auxiliary receiver that detected the matching ID code is determined, the main receiver 804 is instructed to automatically tune to the data stream which the auxiliary receiver that detected the matching ID code is tuned. As such, the main receiver 804 is automatically tuned to the data stream carrying the matching ID code as detected by the auxiliary receiver 806. The new received signals are then output at output 816 for viewing and/or listening by the viewer.

Figure 9B:
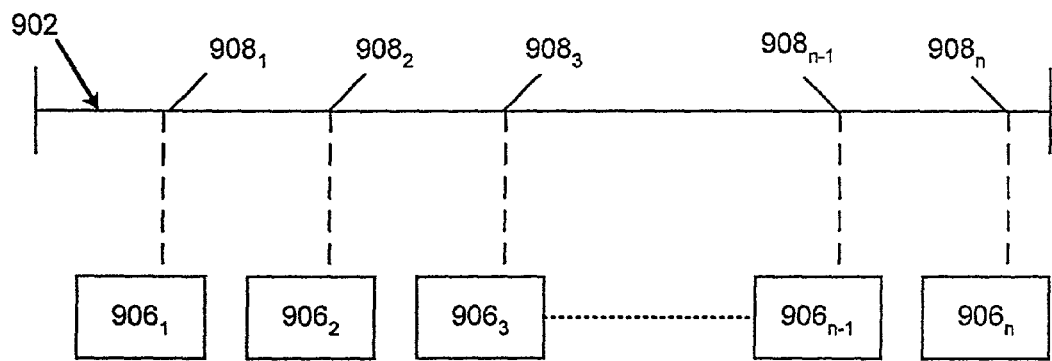
FIG. 9(b) depicts operation of a plurality of auxiliary receivers at a time $t_2$, in accordance with an exemplary embodiment of the invention.

If the comparison output dictates that the ID codes do not match, then the controller unit instructs the auxiliary receiver 806 to move to the next available detectable data stream in the spectrum. As seen in FIG. 9(b) a plurality of auxiliary receivers $906_1$-$906_n$ each monitor a different respective data stream $908_1$-$908_n$ on the data stream spectrum 902, at time $t_2$. Again, if the receivers $906_1$-$906_n$ fail to detects a matching ID code, the process repeats each receiver moves to the next respective data stream until all the data streams are monitored. Once all the data streams have been monitored, the auxiliary receivers return to the original respective data streams as seen in FIG. 9(a).

As for determining the data streams that may be monitored, non-limiting examples of methods include: pre-scanning the spectrum for data streams having a carried signal strength above a predetermined threshold, when the receiving system in turned on; periodically pre-scanning the spectrum for data streams having a carried signal strength above a predetermined threshold; pre-scanning the spectrum for data streams having a carried signal strength above a predetermined threshold, when instructed by an instruction signal either from a controller or by the user; dividing the spectrum into predetermined increments; and programming by the user.

Although the above embodiment is used in an exemplary manner, one of skill in the art, after reading this specification would understand that a single auxiliary receiver 806 may be used, to decrease the cost of production and size of the system. If the receiving system has a single auxiliary scanner, such as depicted in FIG. 8(*a*), the single scanner may still scan the plurality of data streams in a manner described with respect to FIG. 9(*a*) and FIG. 9(*b*). However, it is noted that the scanner must scan all the data streams as opposed to a fraction of the data streams as with the embodiment comprising a plurality of auxiliary scanners.

Figure 10A:
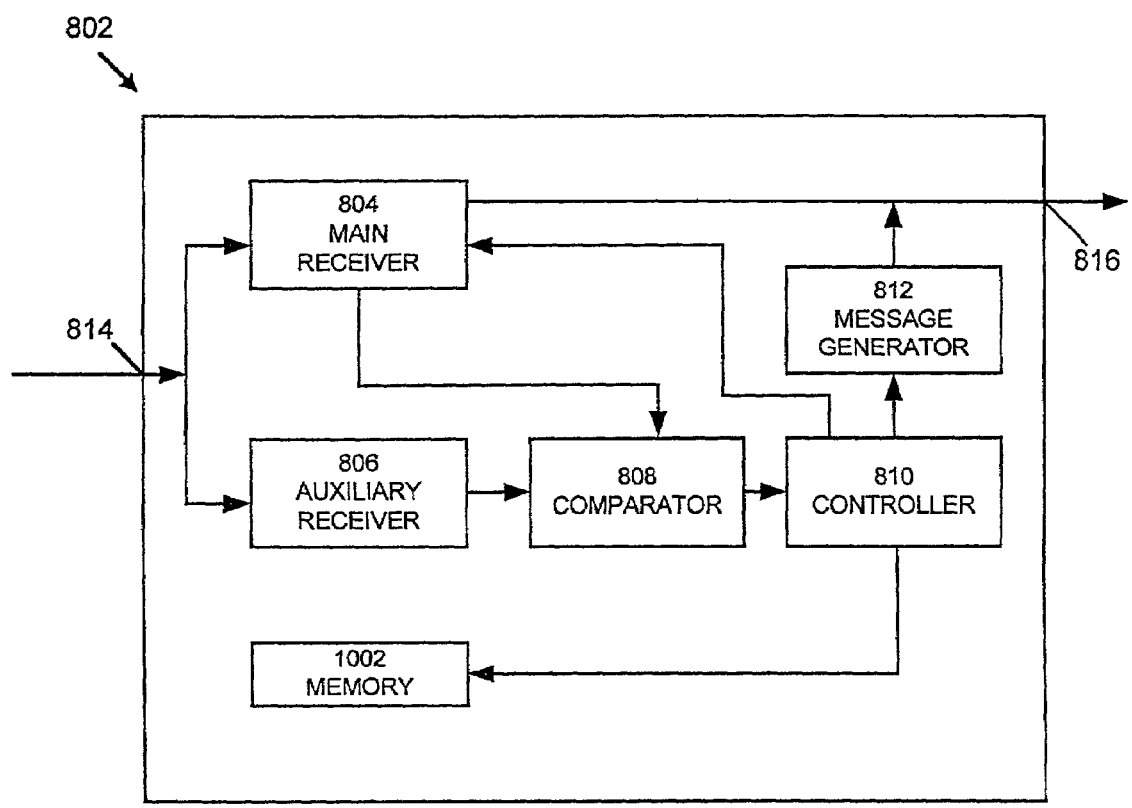
FIG. 10(a) is another exemplary embodiment of a receiving system in accordance with the present invention.
Figure 10B:
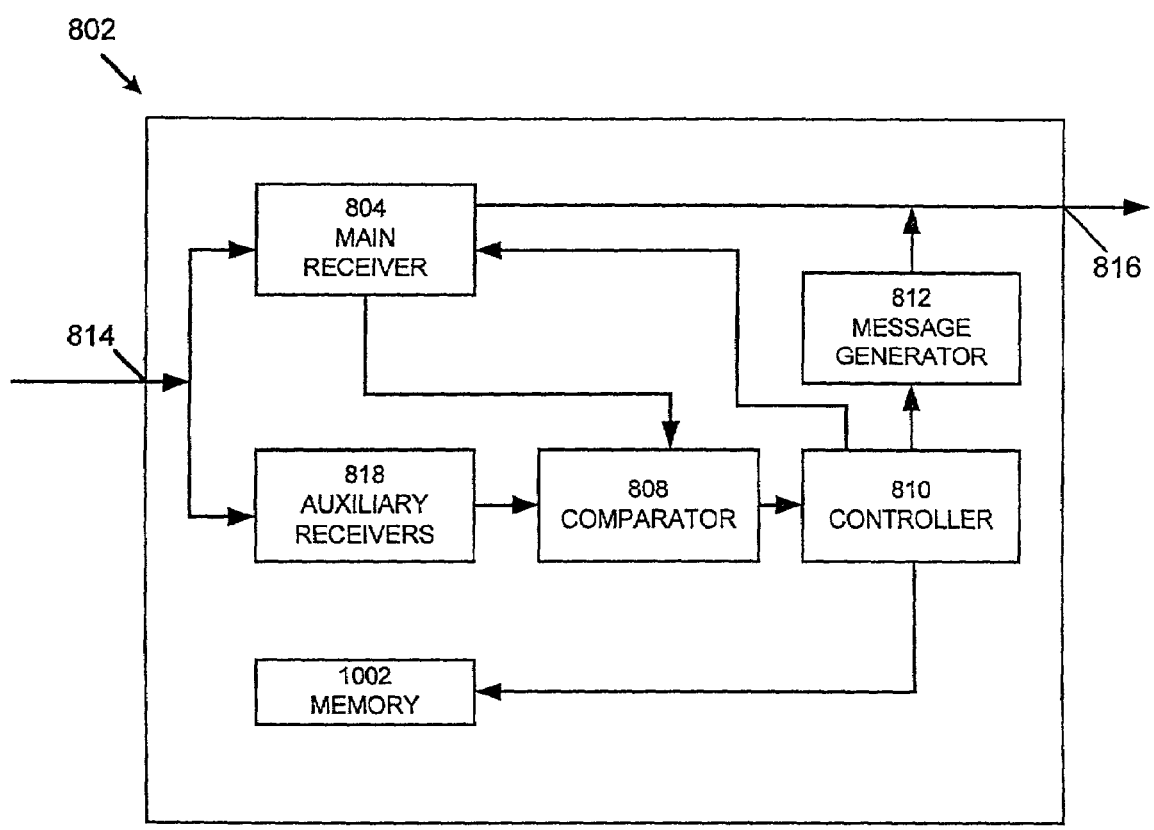
FIG. 10(b) is yet another exemplary embodiment of a receiving system in accordance with the present invention.

FIG. 10(*a*) is another exemplary embodiment of a receiving system in accordance with the present invention. FIG. 10(*a*) is a modified version of the embodiment as described with respect to FIG. 8(*a*). As such, similar items have similar functions and are similarly numbered. FIG. 10(*a*) includes all the features of the embodiment as described with respect to FIG. 8(*a*) with the addition of a memory unit 1002 for storing predetermined data streams from which the auxiliary receiver 806 will scan. With the addition of memory unit 1002, if the comparison output dictates that the ID codes do not match, then the controller unit 810 instructs the auxiliary receiver 806 to move to the next available detectable data stream in the spectrum. The next available detectable data stream in the spectrum is determined from a list of data streams stored in memory unit 1002.

In a system in accordance with an example such as depicted in FIG. 10(*a*), the next available detectable data stream in the spectrum, may be limited to the specific data streams as previously dictated by the user (such as will manual or remote presets), or a previous pre-scan. In one example, as stated earlier, a user may wish to limit the data streams in which the system will scan for a predetermined detected ID code, such as in a radio system in which there are only a finite number of radio stations that are receivable within a specified area. To further limit the number of radio stations that are scanned in this example, there may be only a fraction of the receivable stations that will broadcast a specific signal, such as a particular song, as a result of the different station broadcast format. In another example, the system may pre-scan the spectrum of data streams to determine which data streams are receivable, and only scan the list of data streams that have previously been flagged as detectable. The list the data streams previously dictated by the user or with a pre-scan, are therefore stored in memory unit 502.

FIG. 10(*b*) is another exemplary embodiment of a receiving system in accordance with the present invention. Similar to the relationship between FIG. 10(*a*) and FIG. 8(*a*), FIG. 10(*b*) is a modified version of the embodiment as described with respect to FIG. 8(*b*). As such, similar items have similar functions and are similarly numbered. FIG. 10(*b*) includes all the features of the embodiment as described with respect to FIG. 8(*b*) with the addition of a memory unit 1002 for storing predetermined data streams from which the auxiliary receiver 806 will scan. With the addition of memory unit 1002, if the comparison output dictates that the ID codes do not match, then the controller unit 810 instructs the auxiliary receiver 806 to move to the next available detectable data stream in the spectrum. The next available detectable data stream in the spectrum is determined from a list of data streams stored in memory unit 1002.

Figure 11:
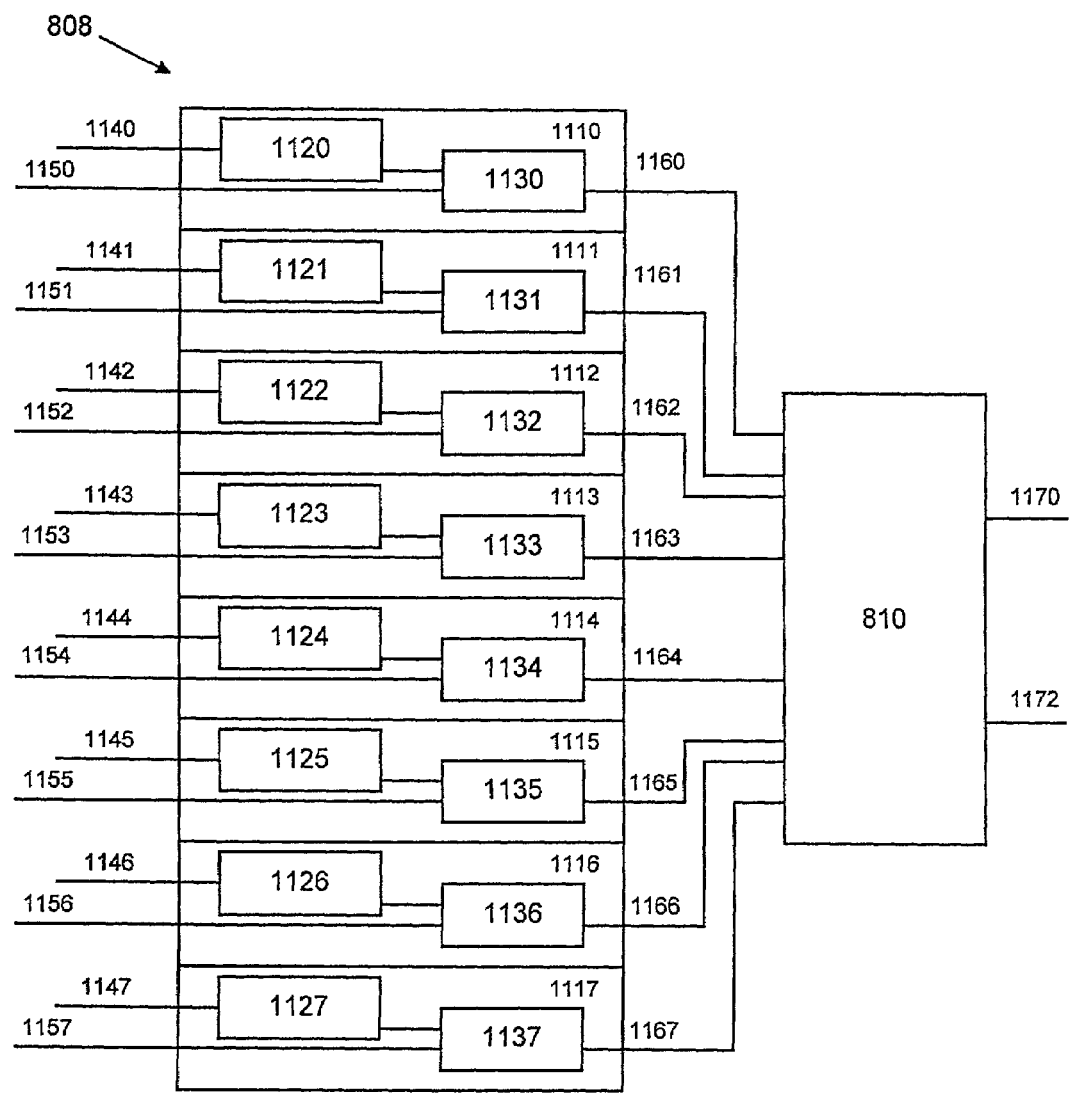
FIG. 11 is an exemplary embodiment of a comparator in accordance with the present invention.

As seen in FIG. 11, comparator 808 contains a series of comparator memories 1110-1117, a controller 810, and a number of data bus lines 1150-1157. This embodiment is not intended to limit the scope of the invention, and is merely representative of a form and function of the present invention. Specifically, in FIG. 11, the series of comparator memories 1110-1117 comprises eight cells, and eight data bus lines 1150-1157 each having data lines corresponding to seven auxiliary receivers. Such a number simplifies the description as the addresability of each cell and input line corresponding to the seven auxiliary receivers are reduced to three bits. It would be apparent to one skilled in the art that such numbers may be increased as limited only by production cost and space of product design.

As seen in FIG. 11, the comparator memories 1110-1117 each contain a respective memory 1120-1127, wherein each respective memory may store a respective ID code; in addition to a respective comparator 1130-1137. Each of the plurality of comparator memories 1110-1117 additionally has a respective input 1140-1147, which inputs the ID code for that particular comparator memory. Furthermore, each of the plurality of comparator memories 1110-1117 additionally has a respective one data bus line 1150-1157, wherein each respective data bus line 1150-1157 carries signals detected from each of the seven auxiliary receivers (not shown). Finally, each of the plurality of comparator memories 1110-1117 additionally has a respective output 1160-1167, leading to controller 810. Outputs 1170 and 1172 are respective outputs to the main receiver 804 and message generator 812.

Figure 12:
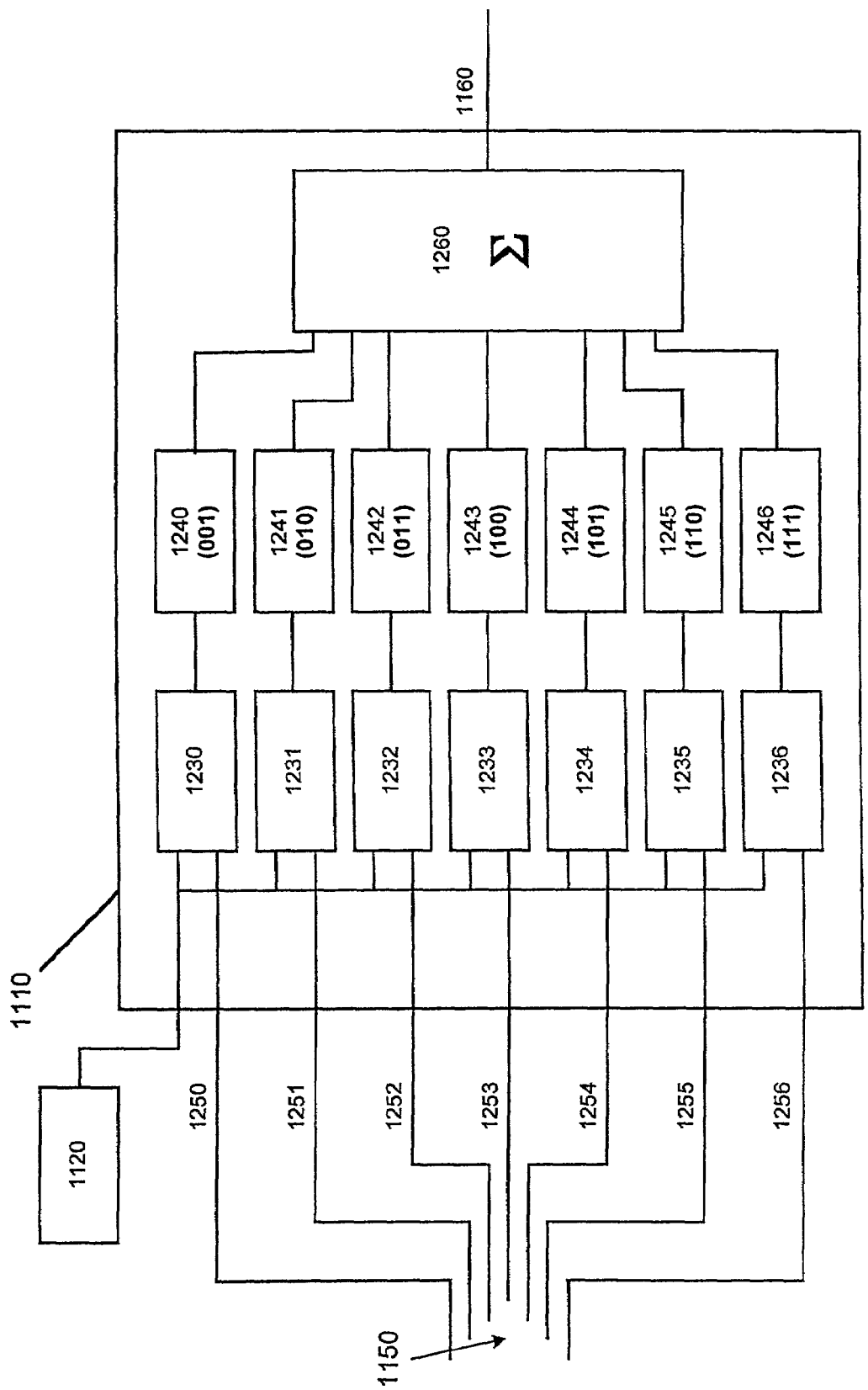
FIG. 12 is an exemplary embodiment of a comparator memory in accordance with the present invention.

FIG. 12 is an exemplary embodiment of the comparator memory 1110. As with FIG. 11, data bus line 1150 has seven data lines 1250-1256 corresponding with the respective seven auxiliary receivers (not shown). This embodiment is not intended to limit the scope of the invention, and is merely representative of the present invention. It would be apparent to one skilled in the art that such numbers may be increased as limited only by production cost and space of product design.

In FIG. 12, memory 1120 stores an ID code, when instructed by a user (such as by pressing a button on the system or an accompanying remote control). This code may be extracted from the broadcast signal in accordance with any known method as previously described. The ID code stored in memory 1120 is fed into each of the seven comparators 1230-1236. The number of comparators is equal to the number of data lines in the data bus, which in turn is equal to the number of auxiliary receivers (in this exemplary embodiment the number is seven). The signals detected by each auxiliary receiver are transmitted along respective data lines 1250-1256, and into comparators 1230-1236 where the respective signals are compared with the ID code stored in memory 1120. The output of each comparator is fed into a respective multiplier 1240-1246. When a comparison between the data stored in memory 1120 and the data transmitted by a respective data line is 1 (a match), the output is multiplied by the amount in its respective multiplier, which becomes the amount in the multiplier. When a comparison between the data stored in memory 1120 and the data transmitted by a respective data line is 0 (not a match), the output is multiplied by the amount in its respective multiplier, which becomes 0. The outputs of each multiplier 1240-1246 are sent to summation circuit 1260.

Consequently, the output 1160 of the summation circuit 1260 is an addressable identifier of the data line which contains a signal that matches the ID code in memory 1120, if there is a match. Furthermore, the output 1160 of the summation circuit 1260 is 0, if there is no match. Therefore, if there is a match, that is to say, one of the signals detected by an auxiliary receiver (in a repeating ID code system as described earlier) or modification thereof (in a bait/capture ID code system as described earlier) is the same as an ID code (in a repeating ID code system as described earlier) or a modification thereof (in a bait/capture ID code system as described earlier) stored in 1120, then the output 1160 is an addressable identifier, that identifies that particular auxiliary receiver.

Returning back to FIG. 11, the respective output lines 1160-1167 are then fed into controller 810. If there is a match for any of the comparator memories 1110-1117, then controller 810 instructs the main receiver 804 to tune to the data stream that the auxiliary receiver that corresponds to the addressable identifier is currently monitoring. If there is no match for any of the predetermined detected ID signals, then controller 810 instructs each auxiliary receiver to move to the next incremental data stream in the spectrum.

The number of comparator memories 1110-1117 is dictated by engineering priorities. Of course the increase in number of comparator memories 1110-1117 may increase the cost, size, and complexity of the system. On the other hand, the increase in the number of comparator memories 1110-1117 may increase the number of storable predetermined signals from which the system may automatically tune to. For sake of convenience, the operation of the present invention is described with eight such comparator memories for the purpose of having a three bit addressable system. It is understandable that this description is not limited to such a number, wherein one skilled in the art may easily increase or decrease the number of comparator memories in order to accommodate a preferential design.

Aspects of the present invention used in conjunction with a communication system will now be described.

In order to streamline communication systems within an area, including computer network access, television, radio, telephone and videophone, a unified system may be desired. The present invention enables fabrication of a unified system wherein specific data streams from many sources, may be automatically recalled, thereby providing easy communication.

An office building may have: a LAN, comprising a plurality of workstations linked by data lines, wherein each station additionally has ultimate access to an outside network such as the Internet; a telephone system; a television system, comprising a plurality of televisions, each having access to a plurality of television channels either by coaxial cable or antenna; and a radio system, comprising a plurality of radios, each having access to a plurality of radio stations either by coaxial cable or antenna. In one embodiment of the present invention the existing systems described above, replaced with, or modified to include broadcasting and/or receiving stations having the ability to automatically tune to a specific data stream after detecting a predetermined ID code.

Specifically, each telephone may be replaced with a device, or modified with a device to permit automatic switching to a specific data stream (for example, telephone line) after detecting a predetermined ID code. More particularly, a telephone in accordance with the present invention may be preprogrammed to scan a plurality of data streams (for example, telephone lines) for a predetermined ID code. If the predetermined ID code is detected, the phone will automatically engage the specific data stream that transmitted the code. As such, a simple intercom system may be realized.

Furthermore, each computer workstation may be replaced with a device, or modified with a device to permit automatic switching to a specific data stream after detecting a predetermined ID code. More particularly, a computer workstation in accordance with the present invention may be preprogrammed to scan a plurality of data streams for a predetermined ID code. If the predetermined ID code is detected, the computer workstation will automatically engage the specific data stream that transmitted the code. As such, a simple interoffice electronic communication system may be realized.

Furthermore, each television, radio, and videophone may additionally be replaced or modified as described above with respect to the telephones and computer workstations. Still further, each system, i.e., telephone, computer, television, radio, videophone, etc., may be unified into one system wherein detected ID code may be sent from any type of broadcasting station and detected by any other type of receiving stations. As such, a simple communication system may be realized.

Data streams used by the communication system in accordance with the present invention may include cables such that the data streams would be excluded from interference from outside sources. However, the data streams may include preexisting data streams such as those within the electromagnetic spectrum that have been assigned to television, radio, cellular phones, etc. Therefore, in order to minimize the interference with the content data that these data streams may carry from broadcasting stations outside the exemplary office building a data stream hopping technique may be used. For example, if radio frequencies within the FM band were used as the data streams, within the communication system, the signals broadcast by FM radio stations within the range of the building using the communication system may interfere with the signals of the communications system. Still further, another method to decrease the probability of the interference would include a prescan of the spectrum of data streams to thereby eliminate the use of any data streams that are being used by sources outside the building's communication system.

Interference may additionally occur from similar communication systems within other buildings in a close proximity to each other. Since the number of data streams may be limited to the size of the available spectrum divided by the bandwidth of each data stream, the number of communication systems within a close proximity may be limited without further means of limiting interference. A method for decreasing interference includes broadcasting and receiving the data streams using a data stream hopping technique.

With one mode hopping technique all the broadcasters and receivers within a communication system may be programmed to broadcast and receive, respectively, along different frequencies, wherein the frequencies change based on a predetermined function.

In another aspect of the present invention, a communication system may be utilized. A plurality of broadcasting/receiving stations; a plurality of broadcasting/receiving stations and a plurality of receiving stations; one broadcasting/receiving station and a plurality of receiving stations; a plurality of broadcasting stations and a plurality of receiving stations; or one broadcasting station and a plurality of receiving stations may be assembled so as to create a communication system. Further, such a communication system may use preexisting data streams, such as RF signals in the radio or TV band, or alternatively, such a communication system may use independent data streams. Still further, such a communication system may use a type of data stream hopping technique in order to utilize preexisting data streams to thereby decrease interference with other content data within the preexisting data streams.

Figure 13:
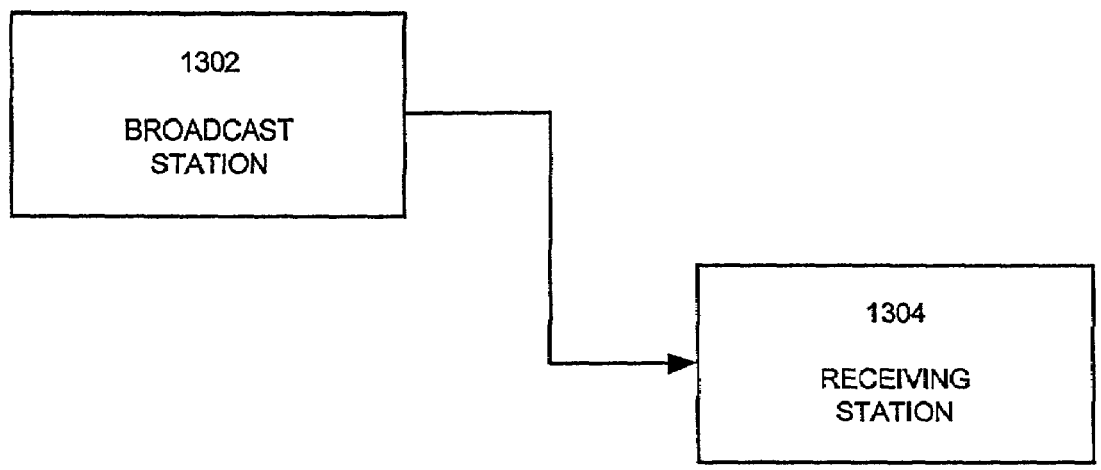
FIG. 13 illustrates the relationship between a broadcasting station and a receiving station in accordance with the present invention.

FIG. 13 illustrates another particularly preferred embodiment of the invention. A broadcast station 1302 broadcasts a program. Broadcast station 1302 may be operated by a cable television service provider, satellite television programming provider or any other provider of television programming. Broadcast station 1302 broadcast a television program over an appropriate medium to a viewer. An appropriate medium may include airwaves, coaxial cable or a computer network such as the Internet.

A receiving station 1304 receives the broadcast program. Receiving station 1304 may be implemented with a television, recording device, computer, settop box, or any combination of the above. Receiving station 1304 receives and displays the broadcasted program.

In addition to broadcasting a program, broadcast station 1302 may broadcast an advertisement for another program and identifying data, such as an ID code, to identify the advertised program. The identifying data may be transmitted in the vertical blanking interval of the original program or the advertisement. Any of the other data transmission methods discussed above may also be utilized.

While viewing the advertisement, the user may elect to view, record, be reminded of, or store information relating to the advertised program. For example, the user may elect to automatically tune a tuner to the advertised program when the program is broadcast by broadcast station 1302 or another broadcast station (not shown). The identifying data may include the start and stop times of the program and an identification of the source of the program, such as channel number. When indicated by the viewer, the identification data may be stored in a memory. In one embodiment, the information may be retrieved by a controller at an appropriate time and used to automatically tune a tuner.

The identification data may be stored in a buffer memory for a predetermined length of time to allow the viewer to make a selection after the advertisement has ended. For example, a viewer may view an advertisement and make a selection to tune to the advertised program at any time prior to the next advertisement. This embodiment provides the viewer time to find and access a remote control device, settop box or television. While the present invention has been described in connection with the illustrated embodiments, it will be appreciated and understood that modifications may be made without departing from the true spirit and scope of the invention.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of programming a television receiver system comprising:
   receiving a first broadcast television program with a main receiver, the first broadcast television program being received on a first channel during a first time period;
   receiving a commercial corresponding to a second television program with the main receiver, the commercial being received on the first channel during a second time period, the second time period being within the first time period;
   receiving an ID code with the main receiver, the ID code being received on the first channel during the second time period;
   if a user instruction is received during the second time period, activating the receiver system during the second time period to extract and store the ID code;
   monitoring a plurality of television channels with an auxiliary receiver; and
   automatically tuning the main receiver to a second channel after the first period if the stored ID code is detected on the second channel by the auxiliary receiver.

2. The method of claim 1, wherein the ID code includes a plurality of types of ID codes comprises repeating ID codes, bait ID codes, capture ID codes, and programming ID codes.

3. The method of claim 2, wherein the types of programming ID codes further comprise:
   a first type of programming ID code including information relating to a start date, and a start time;
   a second type of programming ID code including information relating to a start date, a start time, and an end time;
   a third type of programming ID code including information relating to a start date, and a duration;
   a fourth type of programming ID code including information relating to a start date, a start time, and a data stream;
   a fifth type of programming ID code including information relating to a start date, a start time, an end time, and a data stream; and
   a sixth type of programming ID code including information relating to a start date, a duration, and a data stream.

4. The method of claim 1, wherein the ID code comprises a differentiating portion comprising two bits.

5. A method of programming a television receiver system comprising:
   receiving a first broadcast television program with a main receiver, the first broadcast television program being received on a first channel of a plurality of channels during a first time period;
   receiving a commercial corresponding to a second television program with the main receiver, the commercial being received on the first channel during a second time period, the second time period being within the first time period;
   receiving an ID code with the main receiver, the ID code being received on the first channel during the second time period;
   if a user instruction is received during the second time period, activating the receiver system during the second time period to extract and store the ID code;
   monitoring the plurality of television channels following the second time period with an auxiliary receiver; and
   if the ID code is detected on the plurality of television channels by the auxiliary receiver following the second time period, automatically tuning the main receiver to a second channel of the plurality of television channels on which the ID code was detected.

6. The method of claim 5, further comprising displaying during the second period an availability indicator.

7. The method of claim 5, wherein the user instruction comprises a signal transmitted from a remote control in response to a user button press.

8. A method of programming a television comprising:
   receiving a first broadcast television program with a main receiver, the first broadcast television program being received on a first channel of a plurality of channels during a first time period;
   receiving a commercial corresponding to a second television program with the main receiver, the commercial being received on the first channel during a second time period, the second time period being within the first time period;

receiving an ID code with the main receiver, the ID code being received on the first channel during the second time period;

if a user instruction is received during the second time period, activating the receiver system during the second time period to extract and store the ID code;

monitoring the plurality of television channels following the second time period with an auxiliary receiver; and automatically tuning the main receiver to a second channel after the first period if the stored ID code is detected on the second channel by the auxiliary receiver.

9. The method of claim 8, further comprising displaying during the second period an availability indicator.

10. The method of claim 8, wherein the user instruction comprises a signal transmitted from a remote control in response to a user button press.

11. A method of programming a television receiver system comprising:

receiving a first broadcast television program with a main receiver, the first broadcast television program being received on a first channel of a plurality of channels during a first time period;

receiving a commercial corresponding to a second television program with the main receiver, the commercial being received on the first channel during a second time period, the second time period being within the first time period;

receiving a bait code with the main receiver, the bait code being received on the first channel during the second time period;

if a user instruction is received during the second time period, activating the receiver system during the second time period to store the bait code;

decoding the bait code to generate a capture code; and monitoring the plurality of television channels following the second time period with an auxiliary receiver; and if the capture code is detected on the plurality of television channels by the auxiliary receiver following the second time period, automatically tuning the main receiver to a second channel of the plurality of television channels on which the capture code was detected.

12. A system comprising:

a television receiver system, the television receiver system operable to receive a plurality of television channels, the television receiver system comprising an automatic tuner, a main receiver, and an auxiliary receiver, the automatic tuner being operable to automatically tune the main receiver to a particular channel, the television receiver system programmed to:

receive a first broadcast television program with the main receiver, the first broadcast television program being received on a first channel during a first time period;

receive a commercial corresponding to a second television program with the main receiver, the commercial being received on the first channel during a second time period, the second time period being within the first time period;

receive an ID code with the main receiver, the ID code being received on the first channel during the second time period;

if a user instruction is received during the second time period, activate the television receiver system during the second time period to extract and store the ID code;

monitor the plurality of television channels with the auxiliary receiver; and automatically tune the main receiver to a second channel after the first period if the stored ID code is detected on the second channel by the auxiliary receiver.

13. A television receiver system operable to receive a plurality of television channels, the receiver system comprising:

means for receiving a first broadcast television program, the first broadcast television program being received on a first channel during a first time period and receiving a commercial corresponding to a second television program with a main receiver, the commercial being received on the first channel during a second time period, the second time period being within the first time period;

means for detecting an ID code with the main receiver, the ID code being received on the first channel during the second time period;

means for activating the receiver system during the second time period to extract and store the ID code if a user instruction is received during the second time period;

means for monitoring the plurality of television channels using an auxiliary receiver; and means for automatically tuning the main receiver to a second channel after the first period if the stored ID code is detected on the second channel by the means for monitoring the plurality of television channels using the auxiliary receiver.

14. The television receiver of claim 13, wherein the means for receiving the first broadcast includes an automatic tuner.

* * * * *